(12) United States Patent
Matsumoto et al.

(10) Patent No.: US 6,822,938 B2
(45) Date of Patent: Nov. 23, 2004

(54) OPTICAL DISK HAVING LANDS AND GROOVES WITH A REDUCED TRACK PITCH

(75) Inventors: Hiroyuki Matsumoto, Tokyo (JP); Seiji Morita, Yokohama (JP); Masatoshi Hayashi, Kawasaki (JP); Satomi Yoshibe, Kawasaki (JP)

(73) Assignee: Research Investment Network, Inc., Irvine, CA (US)

( * ) Notice: Subject to any disclaimer, the term of this patent is extended or adjusted under 35 U.S.C. 154(b) by 0 days.

(21) Appl. No.: 10/395,731

(22) Filed: Mar. 24, 2003

(65) Prior Publication Data

US 2003/0179691 A1 Sep. 25, 2003

Related U.S. Application Data

(60) Continuation of application No. 10/105,537, filed on Mar. 25, 2002, now abandoned, which is a continuation of application No. 09/264,735, filed on Mar. 9, 1999, now Pat. No. 6,407,979, which is a division of application No. 08/760,636, filed on Dec. 4, 1996, now abandoned.

(30) Foreign Application Priority Data

| Dec. 5, 1995 | (JP) | ............................................. 7-316595 |
| Jan. 8, 1996 | (JP) | ............................................. 8-000810 |
| Feb. 19, 1996 | (JP) | ............................................. 8-042995 |
| Mar. 12, 1996 | (JP) | ............................................. 8-054488 |
| Apr. 16, 1996 | (JP) | ............................................. 8-094539 |

(51) Int. Cl.$^7$ ................................................. G11B 7/24
(52) U.S. Cl. .................................. 369/275.4; 369/275.1
(58) Field of Search ........................... 369/275.3, 275.4, 369/275.1, 275.2, 44.26, 44.28, 44.37, 44.29, 44.11, 277, 278, 279, 286, 283; 365/122; 428/64.4

(56) References Cited

U.S. PATENT DOCUMENTS

| 5,414,652 A | * | 5/1995 | Mieda et al. ................ 365/122 |
| 5,493,561 A | * | 2/1996 | Nishiuchi et al. ......... 369/275.1 |
| 5,508,995 A | | 4/1996 | Moriya et al. ............ 369/275.4 |
| 5,553,051 A | * | 9/1996 | Sugiyama et al. ...... 369/109.02 |
| 5,581,531 A | * | 12/1996 | Ito et al. ...................... 369/100 |
| 5,581,539 A | * | 12/1996 | Horie et al. .............. 369/275.4 |
| 5,586,109 A | * | 12/1996 | Inui et al. .................... 369/277 |
| 5,602,824 A | * | 2/1997 | Ooki et al. ............... 369/275.4 |
| 5,602,825 A | * | 2/1997 | Sugaya et al. ........... 369/275.4 |
| 5,636,201 A | * | 6/1997 | Ooki ........................ 369/275.4 |
| 5,648,954 A | * | 7/1997 | Satoh ....................... 369/53.17 |
| 5,694,379 A | * | 12/1997 | Aratani et al. ........... 369/13.55 |
| 6,038,209 A | * | 3/2000 | Satoh ....................... 369/275.3 |
| 6,058,100 A | * | 5/2000 | Mieda et al. ............. 369/275.4 |
| 6,407,979 B1 | | 6/2002 | Matsumoto et al. ...... 369/275.4 |

* cited by examiner

*Primary Examiner*—Ali Neyzari
(74) *Attorney, Agent, or Firm*—Keiji Masak; Steve Wong; Caroline Do

(57) ABSTRACT

An optical disk has grooves and lands located on the disk. A predetermined distance between the grooves and lands is defined as a predetermined track pitch. The predetermined track pitch is defined in term of a laser wavelength used during an operation. The grooves have a depth "d" in relation to the lands. The depth is related to a parameter variable "a" and a refraction index "n" of a substrate.

28 Claims, 16 Drawing Sheets

FIG. 2(a) DIRECTION OF SPOT TRAVEL

IMPROVEMENT OF THE SENSITIVITY DIFFERENCE BETWEEN A LAND AND GROOVE BY WIDENING THE GROOVE WIDTH

GROOVE WIDTH 280nm 140 nm

OPTICAL DISK HAVING LANDS AND GROOVES WITH A REDUCED TRACK PITCH

This application is a continuation of Ser. No.: 10/105,537, filed Mar. 25, 2002, now abandoned, which is a continuation of U.S. Pat. No. 09/264,735, filed Mar. 9, 1999, U.S. Pat. No. 6,407,979; which in turn is a divisional of U.S. Pat. No. 08/760,636, filed Dec. 4, 1996, now abandoned, the entirety of which is incorporated herein by reference.

FIELD OF THE INVENTION

This invention is generally related to a high density optical disk and a method of high density recording on an optical disk. Specifically, it relates to an optical disk which records on both lands and grooves with a reduced track pitch and the recording method.

BACKGROUND OF THE INVENTION

For high speed data processing, high density optical disks have attracted attention. With the ISO standardization of 5.25-inch and 3.5-inch disks for optical and phase change schemes for overwriting, these disks can be expected to have even more widespread use in the future. Recently, the DVD (digital video disk) standardization such an SD standardization is about to be finalized. This standardization is expected to accelerate the use of optical disks in the area of multimedia.

In these optical disks, grooves and lands are used to guide a laser spot emitted from a pickup of a read/write system to the data. These grooves and lands are formed in a spiral from the center of the medium to its outer circumference. These grooves are called guide grooves. More specifically, as defined in the ISO standard, the recessed portions, which are more distant, as viewed from the pickup, are referred to as lands, and the raised portions closer to the pickup, are referred to as grooves.

Using a land recording method, the groove widths of from about 0.3 $\mu$m to about 0.6 $\mu$m, and the groove depths of about $\lambda/8(n)$ to about $\lambda/4(n)$ wherein $\lambda$ is the wavelength of a laser beam used during input and output operations, and n is a refractive index of substrate. Although the standard track pitch is 1.6 $\mu$m, narrower track pitches are used to increase the density of the recorded data.

When using an optical pick up having an object lens of about 0.5 to about 0.6 aperture numerical (NA), the impact of the narrow track pitch on the undesirable simultaneous reading of data from adjacent tracks (hereafter referred to as the optical crosstalk) becomes critical and the tracking error signal is also negatively affected for accurate tracking.

For the optical disks currently on the market, the width W of substrate surface grooves is defined as $W=(W_{top}+W_{bottom})/2$, where $W_{top}$ is the width at the top of the groove, and $W_{bottom}$ the width at the bottom. The groove depth is defined as the height of the substrate surface groove from the bottom of the groove to the top (step difference).

Various methods have been tried in an effort to increase the recording density of such optical disks, such as making the laser beam spot smaller by reducing the wavelength of the light source so as to read data at a higher recording density. There is a limit, however, in reducing the spot size due to the wavelength of semiconductor laser that can be used for a light source. In general, short wavelength laser has problems in forming a desirable beam shape as well as in an insufficient output level.

Other efforts to provide a higher recorded data density resulted in the proposal of a technology called magnetically induced super-resolution (MSR). This technology is capable of reading high-density recorded data using a currently available light source wavelength and a spot size. The MSR technology makes use of the temperature distribution of the recording medium inside an area under the light spot (due to a combination of the heating of the medium by the laser and the rotating motion of the medium) to mask a portion of the signal on the medium falling under the light spot so that it will not be detected as the read signal. This masking makes the effective aperture area from which a signal is read smaller than the laser spot size, thus making it possible to read higher density data.

The Front Aperture Detection (FAD) scheme, which is one way of implementing the MSR technology, will be briefly described, in reference to FIG. 2. FIG. 2(a) is a plan view of a FAD-type MSR disk 31, and FIG. 2(b) is a cross-sectional view of Section I—I of FIG. 2(a). The FAD optical disk 31 has three magnetic layers: a recording layer 32, made of TbFeCo; a cutoff layer 33, made of TbFe; and a readout layer 34, made of GdFeCo. The signal is read from the readout layer 34. In the initial state as shown in FIG. 2(b), because coupling force is readily exchanged between the adjacent layers, the orientations of the magnetic field follow the magnetization of the recording layer 32, which stores the data as indicated by recording marks 38. During a read operation, an external magnetic field Hr is applied. When a relative position is established between a readout light spot 35 and a medium 31, as shown in FIG. 2(a), a temperature differential is created between a front low temperature area 36 and a rear high temperature area 37 under the light spot 35.

When the high temperature area 37 reaches the Curie temperature at which its magnetization is obliterated of the cutoff layer 33, the coupling of readout layer 34's magnetization to recording layer 32 (through cutoff layer 33) is diminished, causing the magnetization of readout layer 34 to invert to align with the magnetization of the external magnetic field Hr. In FIG. 2(b), the magnetized direction of location A is inverted.

In the high temperature area 37, the magnetization of readout layer 34 always exhibits a constant state regardless of the presence of a recording mark 38 and is a mask without contributing to the readout signal. On the other hand, the signal is detected only in a low temperature area 36 where its recorded state is maintained. Thus, the low temperature area 36 serves as an effective signal detection aperture of the laser spot. This enables the system to only read recorded mark 38a in the area 36. In this FAD technique, the masking conditions are determined by the Curie temperature of the cutoff layer 33. Thus the MSR disks are manufactured fairly easily by controlling the composition of this cutoff layer. Techniques other than FAD have been proposed for the MSR disks. These include Rear Aperture Detection (RAD) and Center Aperture Detection (CAD), in which the high temperature portion of the spot is the aperture, and the remaining spot area is masked. RAD and CAD MSR disks have a smaller aperture because it is the higher temperature portion of the spot (the temperature distribution resulting from illumination by the readout laser) that is an aperture, and the lower temperature portion that is a mask. In contrast to this, in MSR disks using the FAD technique, the crescent shape of the aperture (low temperature area 36 within readout spot 35) renders it impossible to prevent leakage of signals from adjacent tracks.

The land-groove recording method has been also proposed for a high density recording. In contrast to the method in which data is recorded on either lands or grooves, the land-groove method increases the recording density to a half track pitch from a full track pitch by recording data on both lands and grooves. For example, if the center-to-center distance between adjacent lands (or grooves) and the next adjacent lands (or grooves) is 1.4 μm, the proposed land-groove technique increases the data capacity, by reducing the track pitch to 0.7 μm.

In this technique, an appropriate groove depth substantially reduces optical crosstalk or simultaneous data read from adjacent grooves (or lands). In addition, the center-to-center distance between lands (or grooves) of 1.4 μm provides a sufficient space required to maintain for a tracking error signal.

However, crosserase or heat crosstalk is observed in recording or erasing information on tracks when the temperature of the adjacent tracks rises due to the heat from a laser beam. The higher temperature erases information on the adjacent tracks. Optical disks and the phase change schemes use thermal recording technique. In these optical disks, the shorter the distance between adjacent tracks, the more likely heat travels into adjacent tracks. Accordingly, it is inevitable for the crosserase problems to arise.

As illustrated in FIG. 14, a laser beam is irradiated onto an optical disk while modulating the peak intensity at Pp to the bottom intensity at Pb to form marks and to erase the recorded marks afterwards. To erase the recorded marks, a laser beam is irradiated onto the optical disk from a DC light source as illustrated in FIG. 15. At this time the intensity of the laser beam is determined at Pe. If the marks were originally recorded with the peak intensity at Pp, the erasure beam intensity of Pe should be able to erase the marks.

However, a variety of deviations for recording data originates from focusing or tracking servo mechanisms, contaminated lenses, changes in optical properties with time, contaminated optical disks, and various properties of optical disks due to temperature, humidity, atmospheric pressure, dust in air, etc. The intensity of the laser beam fluctuates as these factors change. As a result of these deviations, a laser beam intensity of Pe at Pp cannot effectively erase data and requires a greater intensity. In other words, the various factors mentioned above may increase Pp to a higher value or decrease Pe to a lower value. In this case, the recorded marks are recorded as physically larger marks as the intensity of the laser beam for erasing decreases. Accordingly, the recorded marks are insufficiently erased to leave a trace of recorded marks on the disk. This may cause recording and reading errors.

The relation between Pe and Pp at the cross-erasure is measured by the method described below. (1) Set a 130 mm optical disk having a groove depth of 75 nm and rotate it at a linear velocity of 9 m/sec. This recording reproduction system is equipped with an optical pickup using the wavelength of 680 nm, NA (numerical aperture) of 0.55, and the wave front aberration of 0.04 λ (rms value). The system records data on the optical disk such that both the length of marks and the distance between marks are 1.2 μm. The bottom intensity Pp of the laser beam is set to 0.8 mW and the recording field is set to 350 Oe. In addition, the peak intensity Pp is the value showing the minimum level for the 2nd-order harmonic frequency when the recorded marks are read and the read signals are put into a spectrum analyzer; (2) Next, data is recorded on a round of land (1 track) on the optical disk such that both the length of marks and the distance between marks are 0.64 μm while modulating the intensity between the peak intensity Pp and the bottom intensity Pb of 0.8 mW. The magnetic field for recording is set to 350 Oe. Then, the recorded marks are read and the read signals are put into a spectrum analyzer to measure carrier level. (The initial carrier level is indicated as Co); (3) Then, a around of groove (1 track) adjacent to the inner circle of a round of land where the above marks are recorded and each a round of groove (1 track) adjacent to the outer circle are erased for 10 spinnings at Pe, the laser beam intensity erasing as illustrated in FIG. 7; (4) Next, the land on which marks are recorded is reproduced and the reproduced signals are put into a spectrum analyzer to measure a carrier level. (After cross-erasure, carrier level is indicated as Ce); (5) Change the Pe value. Repeat (3) to (4) until Co−Ce=0.5. Obtain Pe/Pp at that time. Then, Pe/Pp is obtained in the same manner as described in the above from (1) to (5) for erasing lands adjacent to recorded grooves.

In the conventional optical disk with guide grooves, the heat crosstalk determines the track pitch. The track pitch for the conventional optical and phase change type disks is limited to about 0.8 μm. The track pitch for the optically modulated overwritable optical type is limited to about 0.9 μm or about 1.0 μm. A narrower track than the above mentioned dimension had been considered impractical.

Since the performance of an optical disk is dependent on not only the heat crosstalk but also noise from the substrate, it had been difficult in prior art to manufacture an optical disk without the above-described two undesirable effects.

Prior art teaches a technique to increase the groove depth in order to reduce thermal crosstalk. In other words, increasing the groove depth increases the distance heat propagates before reaching the adjacent tracks so as to reduce the undesirable effect of heat. For example, Japanese patent 6-223421 discloses that when the groove depth is increased up to 130–280 nm from a conventional range from about 40 to about 90 nm, the track pitch can be narrowed.

This does not mean that any depth of 100 nm or more is acceptable. First, the preferable land or groove reflection coefficient of is 0.5 or more in order to maintain a desirable read signal level. However, the land or groove reflection coefficients vary based on the groove depth. Some groove depth values even lower the readout signal level, causing a data readout error. In addition, although a preferable push-pull signal modulation factor is larger than 0.2 in order to maintain an accurate tracking capability, some groove depth values lower the push-pull signal modulation factor to cause mistracking, slow access, and erroneous erasure.

The current invention is directed to resolve the above and other described problems and to provide an optical disk having reduced thermal crosstalk and noise from the substrate. In addition, this invention is directed to a method of reading and recording high-density data on an optical disk.

SUMMARY OF THE INVENTION

In order to solve the above and other problems, according to one method of manufacturing optical disks for substantially reducing cross-talk during input and output operations to and from the optical disks each having grooves and lands, data being stored on both the grooves and lands, the method includes the steps of: a) specifying a track pitch between the grooves and the lands; b) selecting a depth of the grooves d in relation to the lands to satisfy a first relation, $d=\lambda/(an)$ where a is a parameter variable, $\lambda$ is a laser wavelength used during the operations and n is a refraction index of an optical disk substrate; and c) further selecting the depth d so as to make the cross-talk equal to or less than −25 dB while the first relation in the step b) is maintained.

According to a second aspect of the current invention, a method of manufacturing optical disks for substantially reducing cross-talk during input and output operations to and from the optical disks each having grooves and lands, data being stored on both the grooves and lands, includes the steps of: a) specifying a track pitch between the grooves and the lands; and b) selecting a depth of the grooves d in relation to the lands to satisfy a first relation, $d=\lambda/(an)$ where a is a parameter variable, $\lambda$ is a laser wavelength used during the operations and n is a refraction index of an optical disk substrate, the parameter ranges from 2.8 to 3.4.

According to a third aspect of the current invention, a method of manufacturing optical disks for substantially reducing cross-talk during input and output operations to and from the optical disks each having grooves and lands, data being stored on both the grooves and lands, includes the steps of: a) specifying a track pitch between the grooves and the lands; b) selecting a depth of the grooves d in relation to the lands to satisfy a first relation, $d=\lambda/(an)+m\lambda/(bn)$ where a and b are parameter variables, $\lambda$ is a laser wavelength used during the operations, m is an integer and n is a refraction index of an optical disk substrate, wherein the parameter a satisfies $5.2 \leq a \leq 6.8$ while the parameter b satisfies $1.8 \leq b \leq 2.1$, m being a natural number.

According to a fourth aspect of the current invention, a method of manufacturing optical disks for substantially reducing thermal cross-talk during input and output operations to and from the optical disks each having grooves and lands including the steps of: a) specifying a track pitch between the grooves and the lands to be equal or less than $1.1\lambda$ where $\lambda$ is a laser wavelength used during the operations; and b) selecting a depth of the grooves d in relation to the lands to satisfy a first relation, $d=\lambda/(an)$ where a is a parameter variable and n is a refraction index of an optical disk substrate.

According to a fifth aspect of the current invention, a method of manufacturing optical disks for substantially reducing thermal cross-talk during input and output operations to and from the optical disks each having grooves and lands includes the steps of: a) specifying a track pitch between the grooves and the lands to be equal or less than $0.96\lambda$ where $\lambda$ is a laser wavelength used during the operations; and b) selecting a depth of the grooves d in relation to the lands to satisfy a first relation, $d=\lambda/(an)$ where a is a parameter variable and n is a refraction index of an optical disk substrate.

According to a sixth aspect of the current invention, a method of manufacturing optical disks for substantially reducing thermal cross-talk during input and output operations to and from the optical disks each having grooves and lands comprising the steps of: a) specifying a track pitch between the grooves and the lands to be equal or less than $0.81\lambda$ where $\lambda$ is a laser wavelength used during the operations; and b) selecting a depth of the grooves d in relation to the lands to satisfy a first relation, $d=\lambda/(an)$ where a is a parameter variable and n is a refraction index of an optical disk substrate.

According to a seventh aspect of the current invention, a method of manufacturing optical disks for substantially reducing thermal cross-talk during input and output operations to and from the optical disks each having grooves and lands comprising the steps of: a) specifying a track pitch between the grooves and the lands to be equal or less than $1.1\lambda$ where $\lambda$ is a laser wavelength used during the operations; and b) selecting a depth of the grooves d in relation to the lands to satisfy a first relation, $d>\lambda/(4n)$ where n is a refraction index of an optical disk substrate.

According to an eighth aspect of the current invention, a method of manufacturing optical disks for substantially reducing thermal cross-talk during input and output operations to and from the optical disks each having grooves and lands, data being stored on both the grooves and lands, including the steps of: a) specifying a track pitch between the grooves and the lands at a predetermined width ratio of the grooves and the lands; and b) selecting a depth of the grooves d in relation to the lands to satisfy a first relation, $d>\lambda/(4n)$ where $\lambda$ is a laser wavelength used during the operations and n is a refraction index of an optical disk substrate.

According to a ninth aspect of the current invention, an optical disk for substantially reducing cross-talk during its input and output operations to and from the optical disks, includes: grooves and lands located on the disk for storing data on both the grooves and the lands, a predetermined distance between the grooves and the lands being defined as a predetermined track pitch, wherein the grooves having a depth d in relation to the lands, wherein the depth is related to a parameter variable a, a laser wavelength $\lambda$ which is used during the operations and a refraction index n of an optical disk substrate in a relation as $(d)>\lambda/(an)$, the depth d is further determined so that cross-talk is equal to or less than $-25$ dB while the relation is maintained.

According to a tenth aspect of the current invention, an optical disk for substantially reducing cross-talk during its input and output operations to and from the optical disks, including: grooves and lands located on the disk for storing data on both the grooves and the lands, a predetermined distance between the grooves and the lands being defined as a predetermined track pitch, wherein the grooves having a depth d in relation to the lands, wherein the depth is related to a parameter variable a, a laser wavelength $\lambda$ which is used during the operations and a refraction index n of an optical disk substrate in a relation as $(d)>\lambda/(an)$, wherein the parameter a ranges from 2.8 to 3.4.

According to an eleventh aspect of the current invention, an optical disks for substantially reducing cross-talk during input and output operations to and from the optical disks, including: grooves and lands located on the disk for storing data on both the grooves and the lands, a predetermined distance between the grooves and the lands being defined as a predetermined track pitch, wherein the grooves having a depth d in relation to the lands, wherein the depth is related to parameter variables a, b and m, a laser wavelength $\lambda$ which is used during the operations and a refraction index n of an optical disk substrate in a relation as $d=\lambda/(an)+m\lambda/(bn)$, wherein the parameter a satisfies $5.2 \leq a \leq 6.8$ while the parameter b satisfies $1.8 \leq b \leq 2.1$, m being a natural number.

According to a twelfth aspect of the current invention, an optical disks for substantially reducing thermal cross-talk during input and output operations to and from the optical disks, including: grooves and lands located on the disk, a predetermined distance between the grooves and the lands being defined as a predetermined track pitch, wherein the predetermined track pitch is equal to or less than $1.1\lambda$ where $\lambda$ is a laser wavelength used during the operations, the grooves having a depth d in relation to the lands, wherein the depth is related to a parameter variable a and a refraction index n of an optical disk substrate in a relation as $d=\lambda/(an)$.

According to a thirteenth aspect of the current invention, an optical disks for substantially reducing thermal cross-talk during input and output operations to and from the optical disks, including: grooves and lands located on the disk, a predetermined distance between the grooves and the lands being defined as a predetermined track pitch, wherein the predetermined track pitch is equal to or less than 0.96 λ where λ is a laser wavelength used during the operations, the grooves having a depth d in relation to the lands, wherein the depth is related to a parameter variable a and a refraction index n of an optical disk substrate in a relation as d=λ/(an).

According to a fourteenth aspect of the current invention, an optical disks for substantially reducing thermal cross-talk during input and output operations to and from the optical disks, including: grooves and lands located on the disk, a predetermined distance between the grooves and the lands being defined as a predetermined track pitch, wherein the predetermined track pitch is equal to or less than 0.81 λ where λ is a laser wavelength used during the operations, the grooves having a depth d in relation to the lands, wherein the depth is related to a parameter variable a and a refraction index n of an optical disk substrate in a relation as d=λ/(an).

According to a fifteenth aspect of the current invention, optical disks for substantially reducing thermal cross-talk during input and output operations to and from the optical disks, including: grooves and lands located on the disk, a predetermined distance between the grooves and the lands being defined as a predetermined track pitch, wherein the predetermined track pitch is equal to or less than 1.1 λ where λ is a laser wavelength used during the operations, the grooves having a depth d in relation to the lands, wherein the depth is related to a refraction index n of an optical disk substrate in a relation as d>λ/(4n).

According to a sixteenth aspect of the current invention, an optical disks for substantially reducing thermal cross-talk during input and output operations to and from the optical disks, including: grooves and lands located on the disk for storing data on both the grooves and the lands, a predetermined distance between the grooves and the lands being defined as a predetermined track pitch, wherein the predetermined track pitch is also specified by a predetermined width ratio of the grooves and the lands, the grooves having a depth d in relation to the lands, wherein the depth is related to a laser wavelength λ used during the operations and a refraction index n of an optical disk substrate in a relation as d>λ/(4n).

BRIEF DESCRIPTION OF DRAWINGS

FIG. 2(a) is a top view of a FAD-type optical disk which is one form of an MSR disk.

DETAILED DESCRIPTIONS OF PREFERRED EMBODIMENTS

Figure 1A:
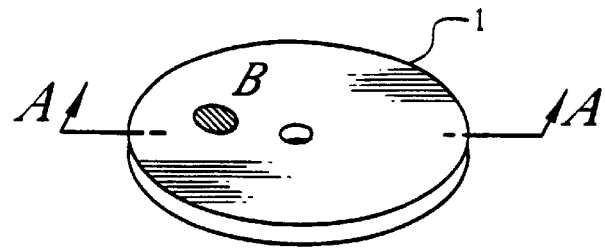
FIG. 1(a) is a diagram showing an optical disk according to the current invention.
Figure 1B:
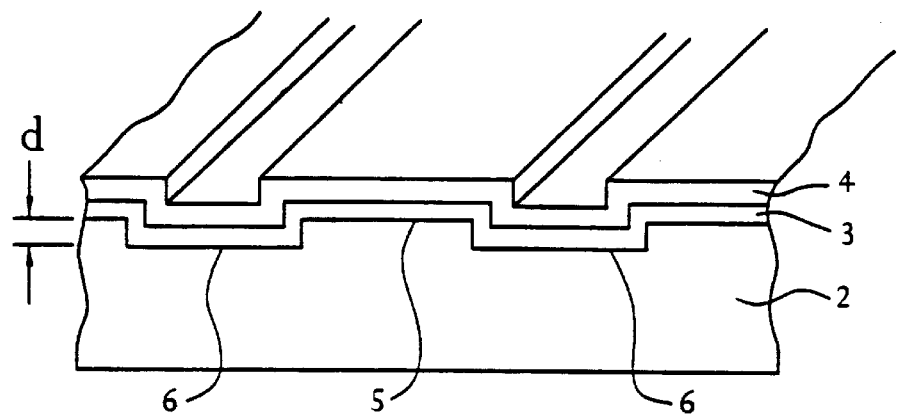
FIG. 1(b) is an enlarged cross-sectional view of the optical disk taken at A—A in FIG. 1(a).

FIG. 1(a) shows an oblique top view of one preferred embodiment of an optical disk 1 according to the present invention, and FIG. 1(b) is an enlarged cross-sectional view of a portion taken at A—A of the optical disk shown in FIG. 1(a). FIG. 1(b) shows a transparent substrate 2 with lands 5 and grooves 6, which respectively appear as recesses and protrusions when viewed from an optical pickup side of the disk. Although the optical pickup is not shown, it is located at the bottom in FIG. 1(b). Still referring to FIG. 1(b), a base layer 3 is made of SiN and formed on the substrate 2, while a recording layer 4 is formed on the base layer 3. Omitted from FIG. 1(b) is a protective layer formed on recording layer 4.

Next, a method of manufacturing an optical disk 1 will be described. According to one preferred method, an example of manufacturing a FAD-type MSR optical disk is described.

First, a stamper and a glass substrate are provided so as to inject UV-cure resin between the stamper and the substrate. The 2P ultra-violet irradiation cure process is performed to harden the resin. This forms a 3.5-inch guide-grooved transparent resin substrate 2, having lands 5 and grooves 6 on the glass substrate. The width of both the lands 5 and the grooves 6 is each 0.6 μm. As an alternative, injection molding is used with the stamper to fabricate a similar guide-grooved plastic substrate 2. Next, a base layer 3 of SiN is formed on the guide-grooved substrate 2 by a sputtering process. Then, a recording layer 4 is formed on the base layer 3 by sequentially sputtering a GdFeCo film layer (readout layer 34 of FIG. 2), a TbFe film layer (a cutoff layer 33), and a TbFeCo film layer (a recording layer 32). The fabrication of the optical disk is then completed by similarly forming a protective layer of SiN (not illustrated) on this recording layer 4.

Figure 3:
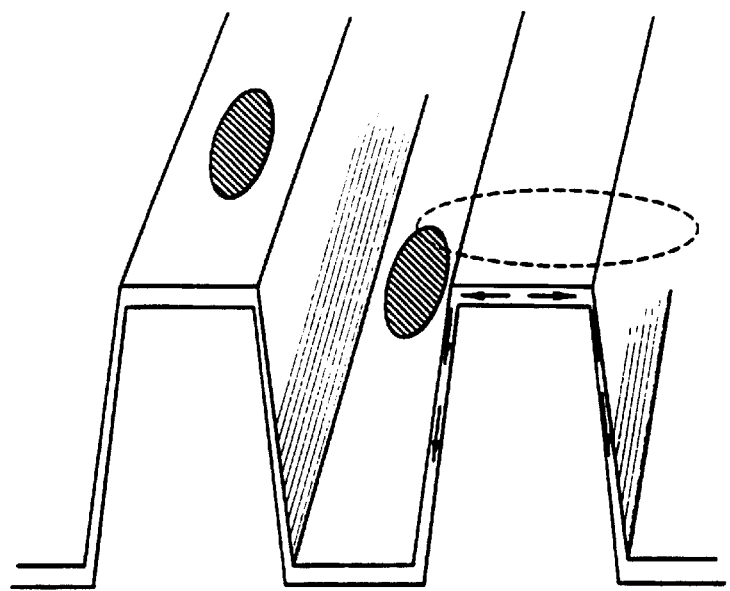
FIG. 3 illustrates how heat travels to the adjacent track through the side walls of the grooves.

Using the above manufacturing method, a number of optical disks having a guide-grooved substrate 2 with different groove depths (i.e., changing the depth d of groove 6) were fabricated. As shown in FIG. 3, the elongated depth provides a longer distance for heat to travel to reach an adjacent track. Each of these optical disks was placed in a recording system and marks (data) were recorded in the lands or grooves. Cross-erasure was measured using an optical pickup with a readout light wavelength 1 of 680 nm, an objective lens numerical aperture (NA) value of 0.55, and wavefront aberration of 0.025 λ (rms) while the substrate was spinning at 2400 rpm. The direction of polarization at normal incidence was parallel to the grooves, and this direction was referred to as E polarization.

Figure 4:
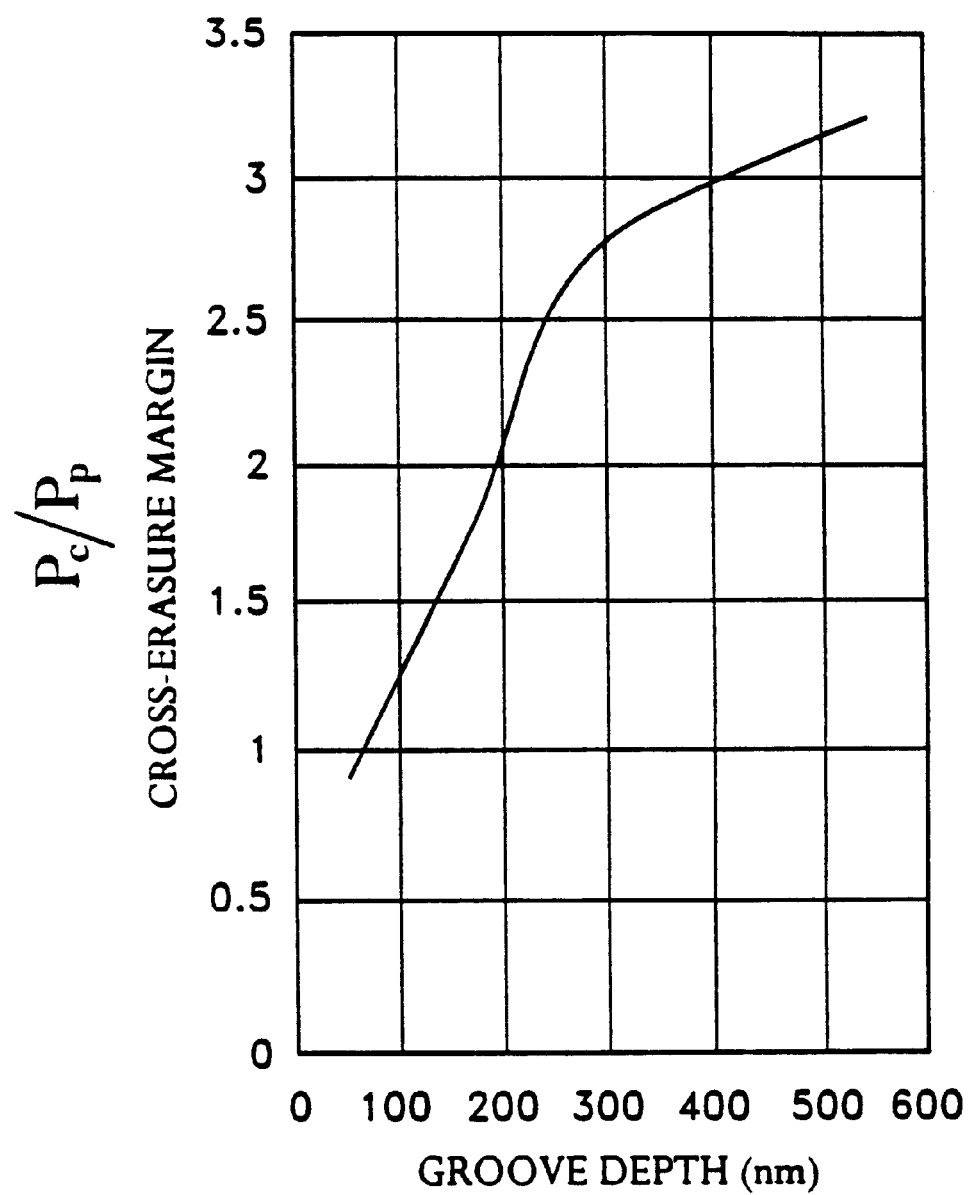
FIG. 4 is a plot showing cross-erasure measurement values in relation to the groove depth.

The above-described cross-erasure measurements are summarized in a graph as shown in FIG. 4. If a land or a groove on the disk is defined to be a first track, an adjacent land or groove is defined to be a second track. In other words, the second track is a groove if the first track is a land. Similarly, the second track is a land if the first track is a groove. Based upon the above definition, cross erasure is a phenomenon wherein the boundary portions of marks recorded in the first track are erased by thermal interference from the second track when recording or erasing is performed on the second track.

The cross-erasure margin plotted in FIG. 4 is the ratio $P_G/P_P$, where $P_P$ is the first track record power (the power of the laser beam for recording marks in the first track), and $P_G$ is a laser beam power at which the second track is recorded or erased to cause the marks recorded in the first track to be erased, and to cause the first track carrier level to be reduced. A large cross-erasure margin generally indicates a greater margin for the first track with respect to P2 when the power of the laser being directed at the second track. In other words, a greater margin means reduced susceptibility to cross-erasure.

Still referring to FIG. 4, the cross-erasure or thermal crosstalk is reduced by increasing d, the depth of the grooves. That is, the groove step size or groove depth should be made greater to increase the thermal propagation distance to an adjacent track.

Figure 5:
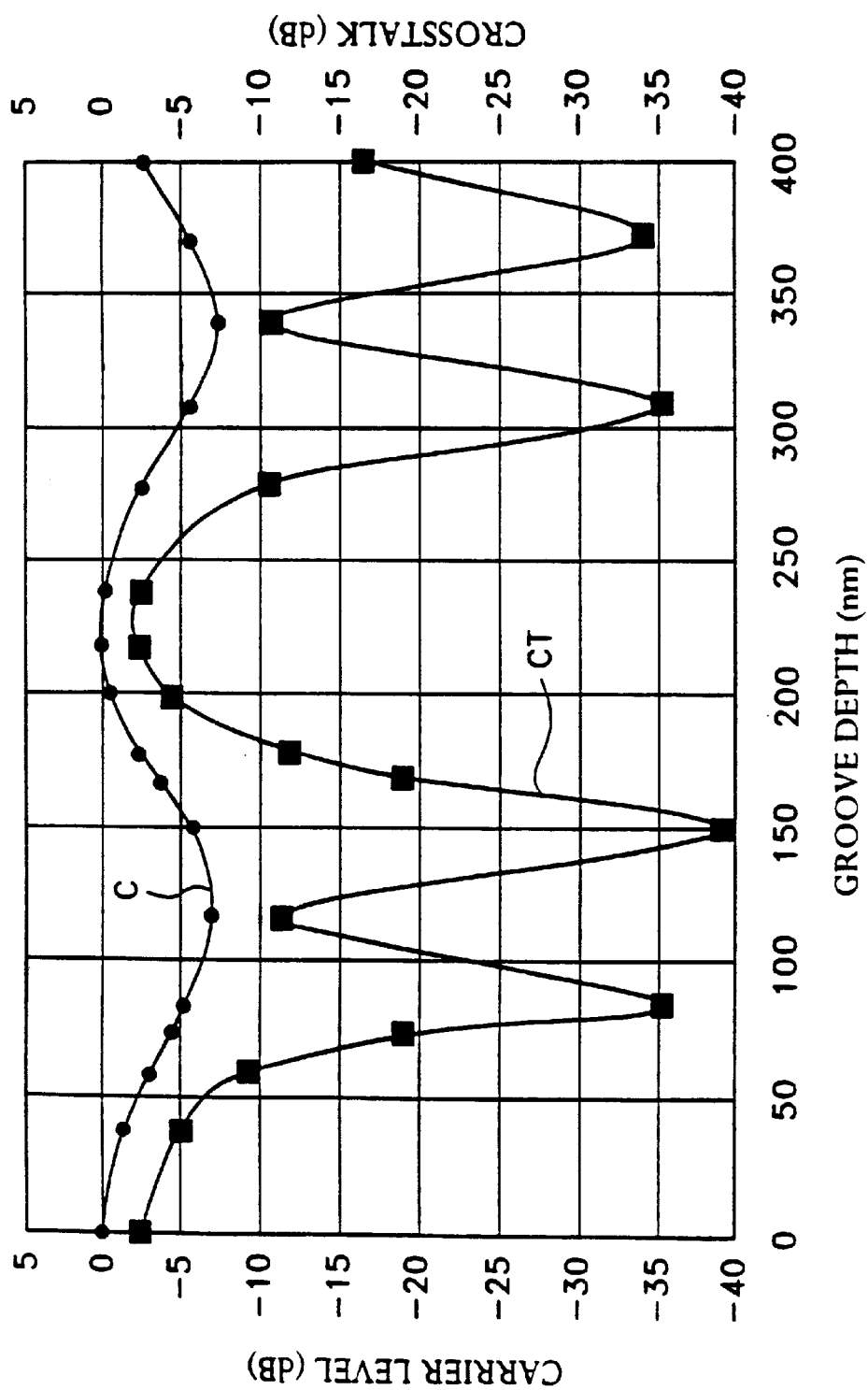
FIG. 5 shows readout signal carrier level and signal crosstalk values in relation to the groove depth.

FIG. 5 shows one example of calculated values for readout signal carrier levels and crosstalk under λ=180 μm, NA=0.55, the groove depth—0.025λ, M=1.5. Carrier level is indicated by a curve C while crosstalk is indicated by a curve CT. The carrier level values shown here are values relative to a signal written to a mirror surface as the reference level. The crosstalk values are the difference between the short mark carrier level and the long mark carrier level when the short marks are recorded on a single track which has adjacent tracks on both sides where the long marks are recorded.

Still referring to FIG. 5, while there is less than 10 dB variation in the carrier level over the groove depth ranging from 0 to 400 nm, there is an approximately 40 dB variation in crosstalk over the same range. The signal crosstalk is thus reduced at certain groove depths. Three groove depths d greater than 100 nm around 150 nm, 310 nm, and 370 nm at which the crosstalk signal has the least values.

According to the manufacturing method described earlier, optical disks are fabricated with groove depths d at 150 nm, 310 nm, and 370 nm. Table 1 shows the signal C/N (carrier-to-noise) ratios and signal crosstalk measurements of the above-described optical disks.

TABLE 1

| Groove Depth d (nm) | C/N (dB) | | Crosstalk (dB) | |
|---|---|---|---|---|
| | Land | Groove | Land | Groove |
| 150 | 43.0 | 42.0 | −38.0 | −36.5 |
| 310 | 42.0 | 42.5 | −30.5 | −29.0 |
| 370 | 42.0 | 41.5 | −28.0 | −28.5 |

Figure 2B:
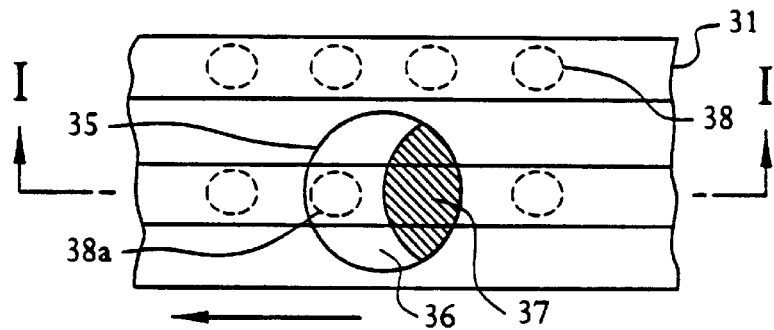
FIG. 2(b) shows a cross-section view taken at I—I of a FAD-type optical disk of FIG. 2(a).
Figure 2B:
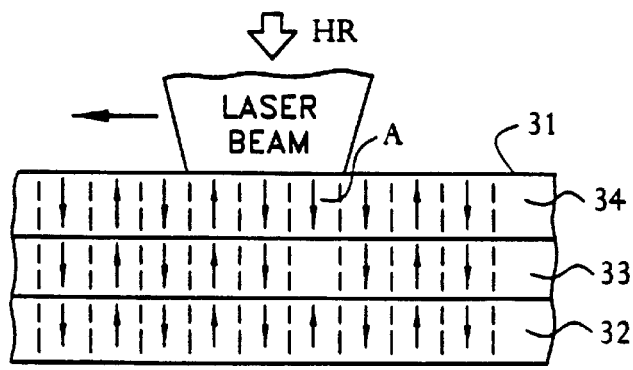

The record/read system described earlier was used to record 0.4 μm-long marks on the disk located at a radius of 35 mm, while applying a 500 Oe magnetic field (the external field Hr of FIG. 2). The C/N values in Table 1 are measured while the recorded marks were read back using a readout power of 3.0 mW. To measure a crosstalk signal, 0.4 μm-long marks were recorded on a first track, and 1.6 μm-long marks were recorded on second tracks adjacent to the first track. The first track was then read, and the difference between the 0.4 μm mark carrier level and the 1.6 μm mark carrier level which leaked from the second tracks was measured as a crosstalk signal. From Table 1, according to one preferred method, the depth d is selected to substantially reduce crosstalk less than −25 dB.

For comparison, a group of optical disks having a groove depth d at 200 nm and 350 nm was fabricated. Table 2 lists the same measurements taken from these disks.

TABLE 2

| Groove Depth d (nm) | C/N (dB) | | Crosstalk (dB) | |
|---|---|---|---|---|
| | Land | Groove | Land | Groove |
| 200 | 45.5 | 45.0 | −8.5 | −7.0 |
| 350 | 42.0 | 41.5 | −16.0 | −17.5 |

From the above table, it was seen that the results of actual measurements as listed in Tables 1 and 2 are compatible with the computed results of FIG. 5. Based on FIG. 5, in order to realize signal crosstalk levels below −25 dB, groove depth should be set within a range of 137 nm –162 nm, 282 nm –326 nm or 364 nm –389 nm.

Note that the characteristics in FIG. 5 are obtained with a readout laser light wavelength λ of 680 nm and a guide-grooved substrate refractive index n of 1.5. Changes in these parameters change the groove depths at which the above-specified minimum crosstalk is obtained. However, in general, the light wavelength of less then 690 nm.

From the foregoing, the depth d of the grooves should preferably satisfy the following equation:

$$d=\lambda/(a\times n)+m\times\lambda/(b\times n)$$

where a, m and b are parameters, λ is a wavelength of laser beam, n is a refractive index of a substrate m, a, and b for the first peaks satisfy the relations m=1, 2, 3 . . . ,
5.2≦a≦6.8, and
1.8≦b≦2.1 and m, a, and b for the second peaks satisfy the relations m=0, 1, 2, 3 . . . ,
2.8≦a≦3.4, and
1.8≦b≦2.1

The track pitch is preferably equal to or less than 1.1 λ, 0.96 λ, or 0.81 λ.

In the alternative, the condition d=λ/(an) where a is a parameter, λ is a laser beam wavelength, and n is a refractive index. The parameter a ranges from 2.8 to 3.4.

Although the present embodiment was described for FAD-type MSR optical disks, the present invention is not dependent upon the films formed groove on guided substrate 2. Therefore, similar results are obtained by the present invention using other types of MSR optical disks. Similar results are also obtained by the present invention using conventional non-MSR optical disks. In fact, similar results are realized by the present invention using phase change-type optical disks.

EXAMPLES OF EMBODIMENTS

Embodiment 1

A plurality of optical disk substrates having a variety of land-groove groove depth or groove depths were prepared. The width of both lands and grooves for these optical disk substrates is 0.7 μm, and their groove depths are from about 50 nm to about 400 nm. These substrates were sputtered with a SiN protective layer 70 nm thick, an optical recording TbFeCo layer 50 nm thick, and a SiN protective layer 70 nm thick in this order to produce the optical disk.

Figure 6:
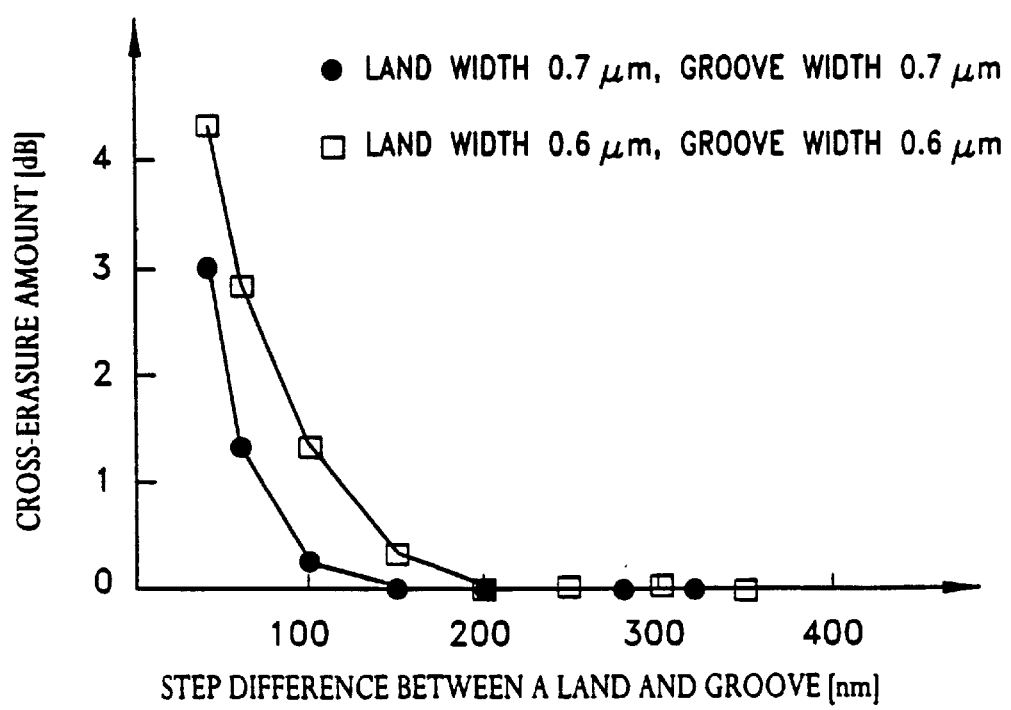
FIG. 6 illustrates a relation between a cross-erasure amount in dB and the groove depth amount.

These optical disks were set in a record/readout system. This record/readout system has an optical head using a semiconductor laser of 680 nm wavelength and an optical head using a lens system of NA 0.55. After a recording mark was recorded in a measurement track, it was erased 100 times by tracking the measurement track by offsetting 0.05 μm toward the adjacent track; the amount of change in the cross erasing on the recording mark recorded on the measurement track was measured. The amount of change in the cross erasing is illustrated in FIG. 6. FIG. 6 shows that the thermal crosstalk phenomena was substantially eliminated when the groove depth was over 100 nm.

Embodiment 2

The measurements were taken in the same manner for disks with the land and groove width each at 0.6 μm. The measurements are shown in FIG. 6. According to FIG. 6, thermal heat crosstalk is substantially eliminated at the groove depth of over 150 nm.

Figure 7:
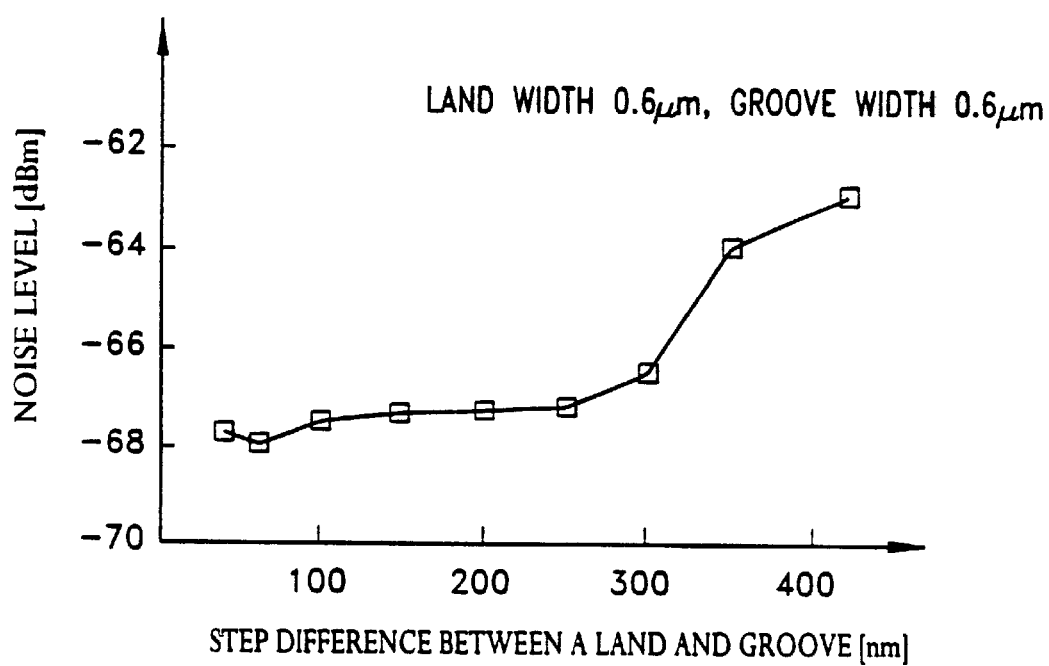
FIG. 7 illustrates a relation between a noise amount in dB and the groove depth.

In addition, noise caused by the condition of the substrate was measured. Referring to FIG. 7, the measurement resulted from a substrate having the land and groove width of 0.6 μm. According to FIG. 7, noise significantly increases when the groove depth is equal to or greater than 300 nm.

The groove depth ranging from about 100 nm to about 300 nm is preferred since the noise level from the substrate is minimized. Also, in the optical disk, at a narrow track pitch around the land and groove width of 0.6 μm, the preferred groove depth ranges from about 150 nm to about 300 nm.

Embodiment Set 1

Prepare a plurality of optical disks at a track pitch of 0.7 μm, 0.6 μm, and 0.5 μm having the following 29 different groove depth between lands and grooves. The 29 groove depth include: 40, 60, 80, 100, 120, 140, 160, 180, 200, 220, 240, 260, 280, 300, 320, 340, 360, 380, 400, 420, 440, 460, 480, 500, 520, 540, 560, 580 and 600.

After placing these optical disks in a record/readout system, the reflection coefficient and the push-pull signal modulation factor in the grooves are measured. The base values $I_G/I_O$ and $I_{PP}/I_O$ are derived from the reflection coefficient $I_O$ which is taken from the region where there are no guided grooves. The optical pickup in the record/readout system uses a laser beam with the wavelength λ of 680 nm, objective lens NA of 0.55, and wavefront aberration 0.04 λ (rms value). The directions of linear polarization at normal incident for an optical disk is selected parallel (referred to as E polarization) or perpendicular to the grooves (referred to as H polarization).

Figure 8:
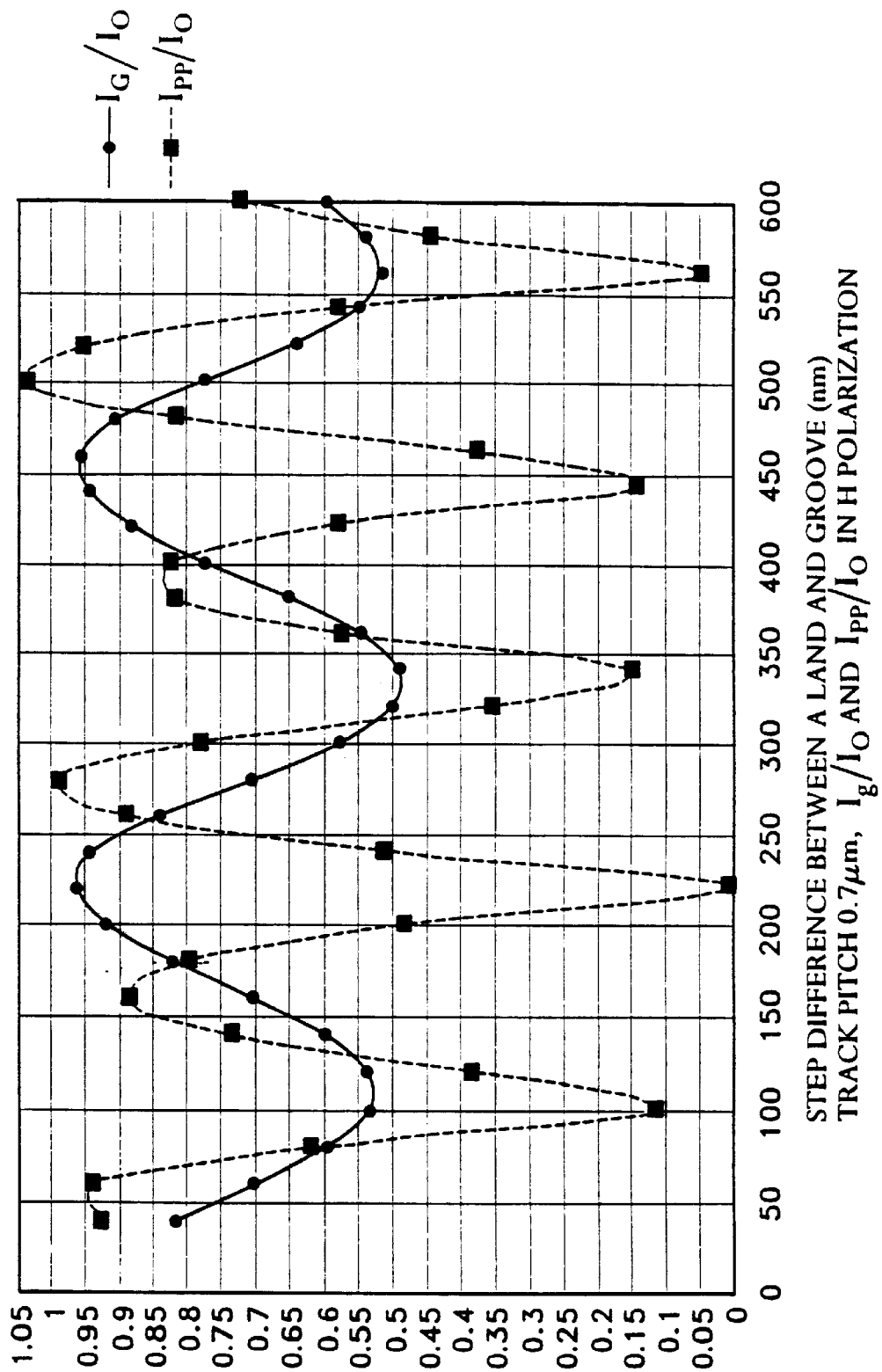
FIG. 8 is a graph showing the relation between the groove depth and $I_G/I_O$ and $I_{PP}/I_O$ during a data read operation using H polarization from an optical disk having both a land width and a groove width of 0.7 μm.
Figure 9:
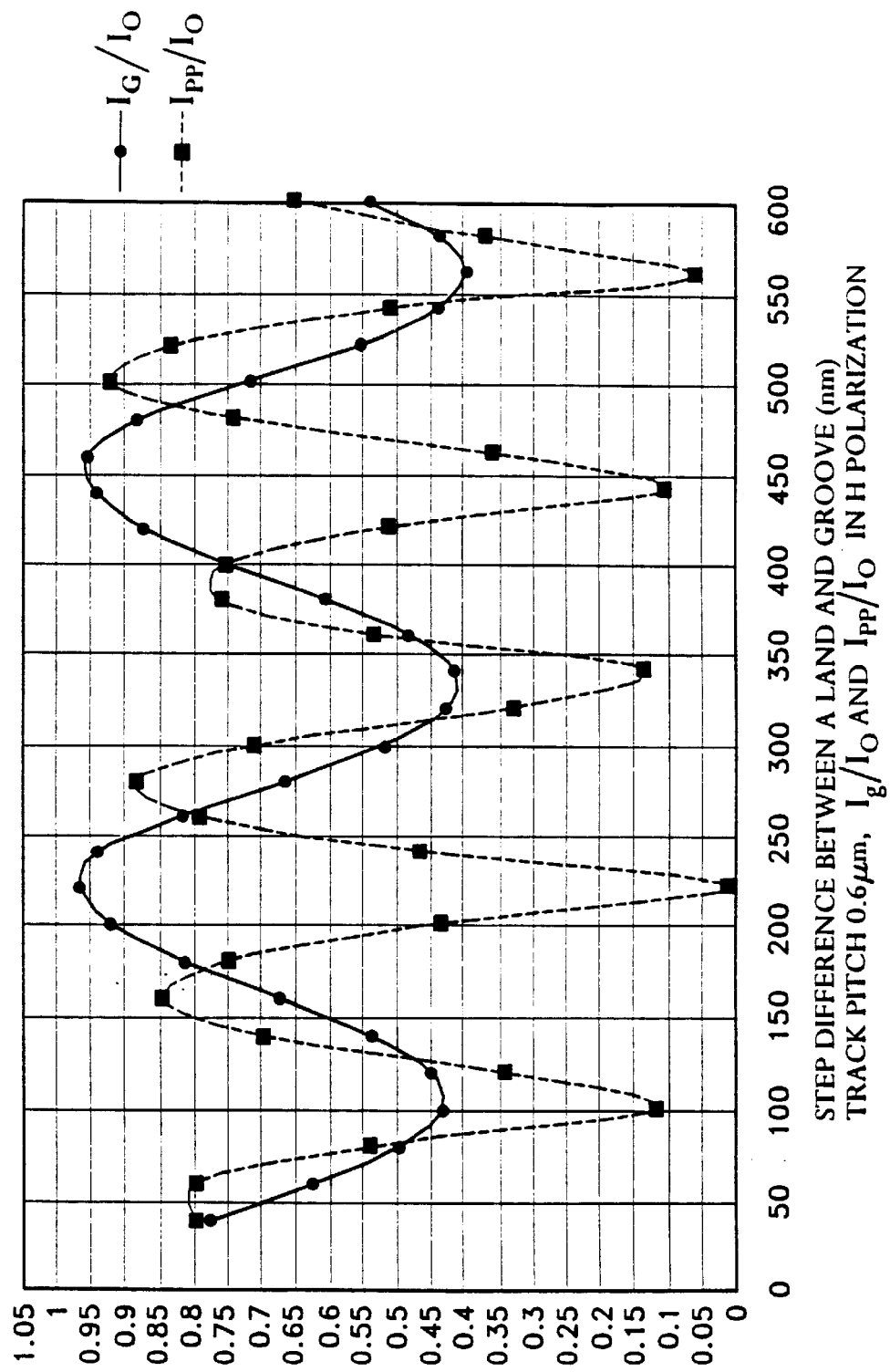
FIG. 9 is a graph showing the relation between the groove depth and $I_G/I_O$ and $I_{PP}/I_O$ during data read operation using H polarization from an optical disk having both a land width and groove width of 0.6 μm.
Figure 10:
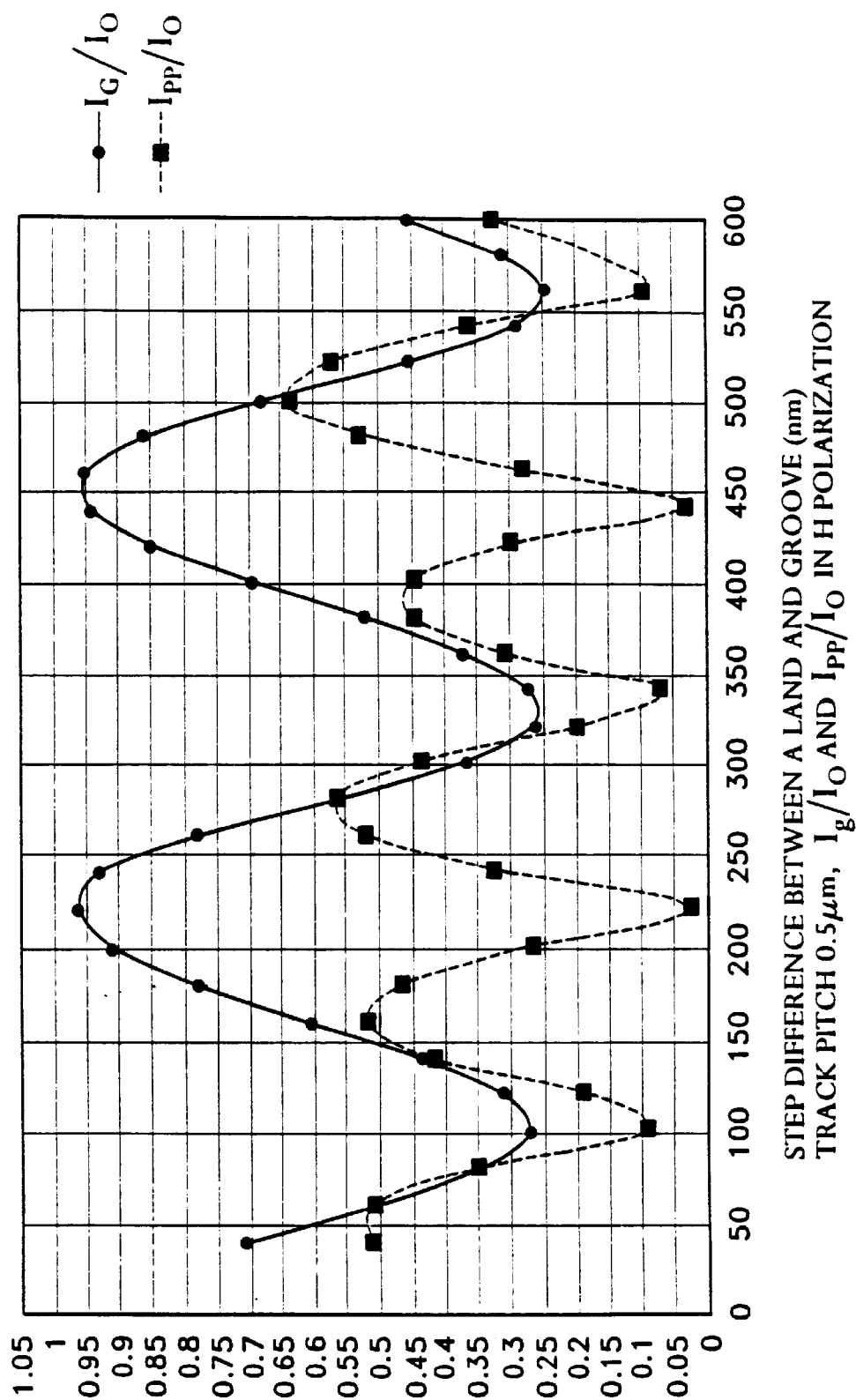
FIG. 10 is a graph showing the relation between the groove depth and $I_G/I_O$ and $I_{PP}/I_O$ during data read operation using H polarization from an optical disk having both a land width and groove width of 0.5 μm.
Figure 11:
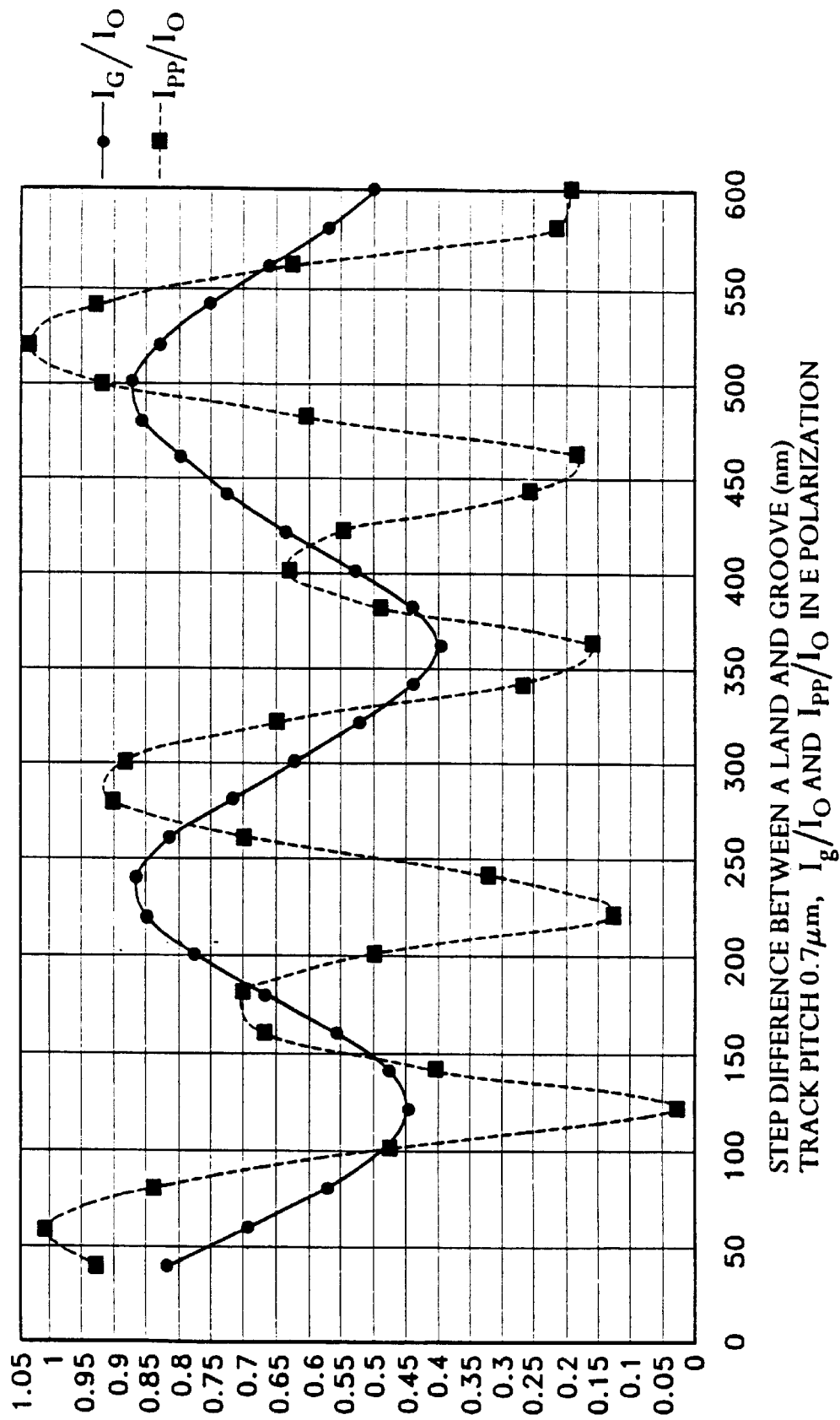
FIG. 11 is a graph showing the relation between the groove depth and $I_G/I_O$ and $I_{PP}/I_O$ during data read operation using E polarization from an optical disk having both a land width and groove width of 0.7 μm.
Figure 12:
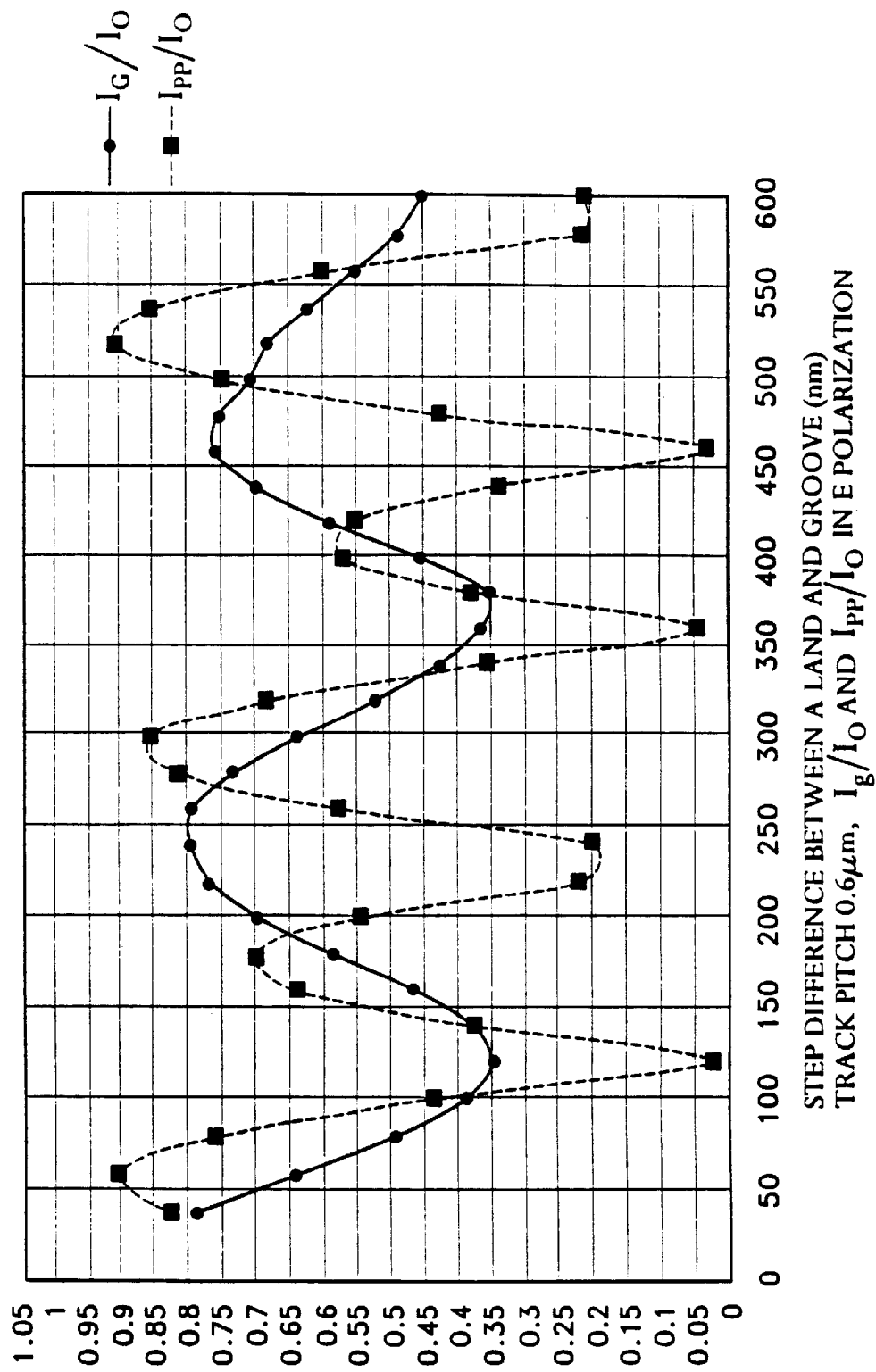
FIG. 12 is a graph showing the relation between the groove depth and $I_G/I_O$ and $I_{PP}/I_O$ during data read operation using E polarization from an optical disk having both a land width and groove width of 0.6 μm.
Figure 13:
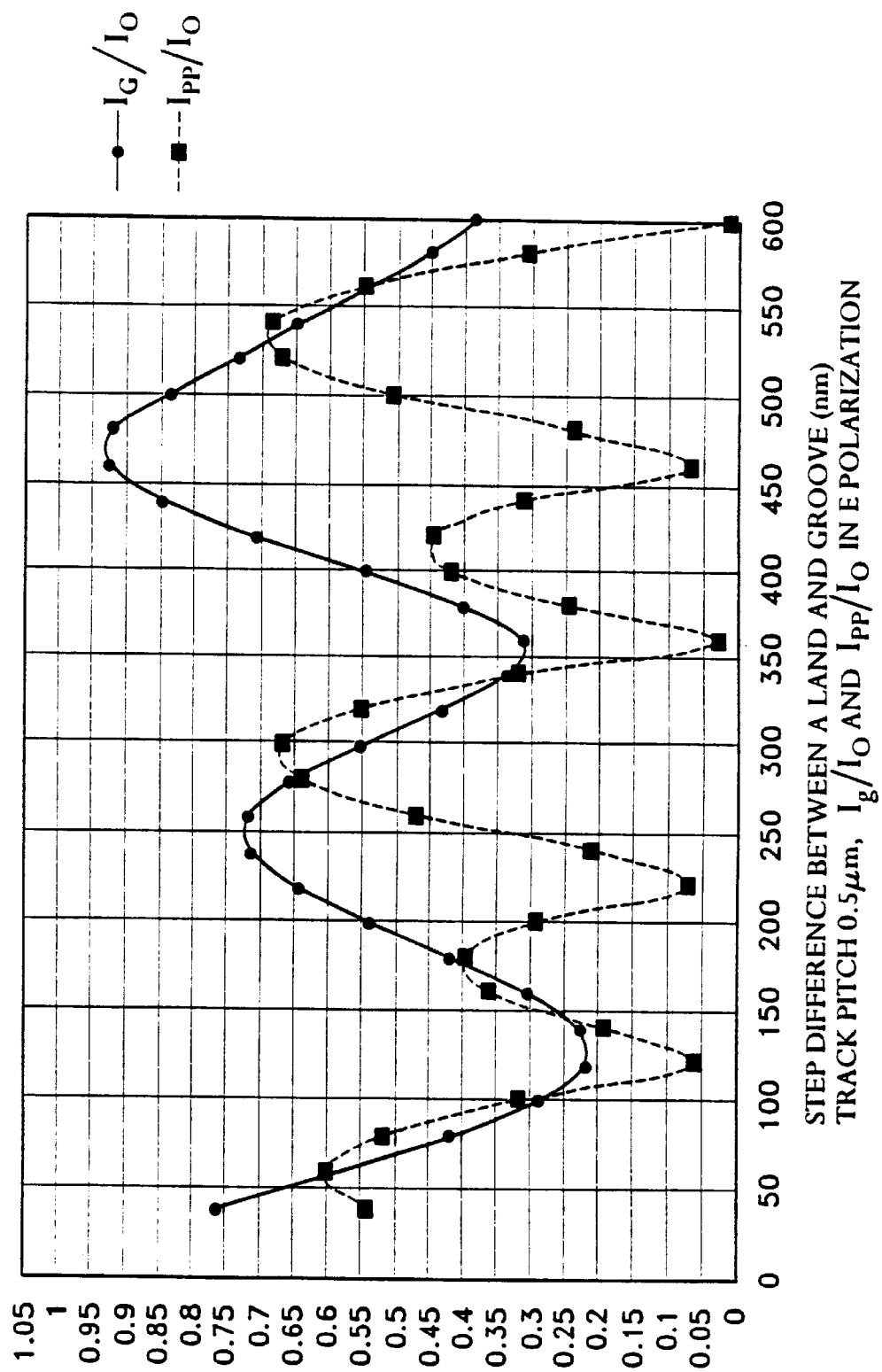
FIG. 13 is a graph showing the relation between the groove depth and $I_G/I_O$ and $I_{PP}/I_O$ during data read operation using E polarization from an optical disk having both a land width and groove width of 0.5 μm.
Figure 14:
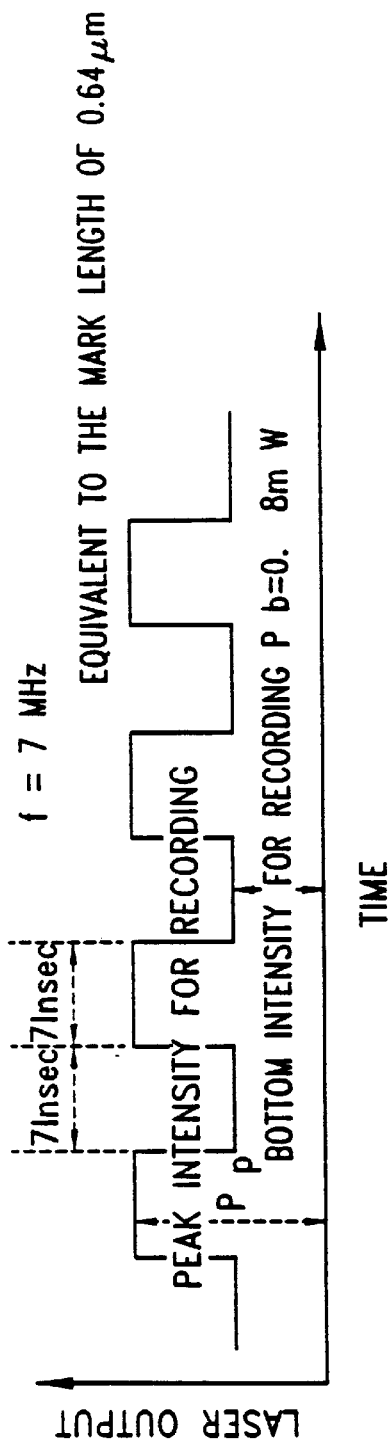
FIG. 14 is a diagram showing a laser beam intensity wave profile modulated for date recording.
Figure 15:
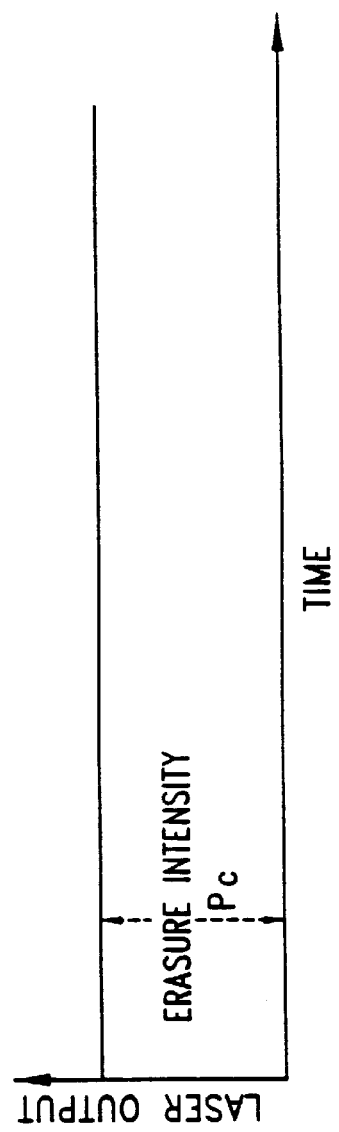
FIG. 15 is a diagram illustrating the laser beam DC profile for erasure.

FIG. 8 is a graph showing $I_G/I_O$ and $I_{PP}/I_O$ during a read operation using H polarization from an optical disk having both the land width and the groove width of 0.7 μm. $I_{PP}$ is a push-pull signal while $I_G$ of $I_L$ is an on-track signal. FIG. 9 shows $I_G/I_O$ and $I_{PP}/I_O$ during a read operation using H polarization from an optical disk having both the land width and the groove width of 0.6 μm; FIG. 10 shows $I_G/I_O$ and $I_{PP}/I_O$ during a read operation using H polarization from a optical disk having both a land width and groove width of 0.5 μm. Also, FIG. 11 is a graph showing $I_G/I_O$ and $I_{PP}/I_O$ during a read operation using E polarization from an optical disk having both the land width and the groove width of 0.7 μm; FIG. 12 shows $I_G/I_O$ and $I_{PP}/I_O$ during a read operation using E polarization from an optical disk having both the land width and the groove width of 0.6 μm; FIG. 13 shows $O_G/I_O$ and $I_{PP}/I_O$ during a read operation using E polarization from an optical disk having both the land width and the groove width of 0.5 μm. Note that the reflection coefficient of lands ($I_L/I_O$) is nearly equal or proportional to that of the grooves $I_G/I_O$, showing the same orientation.

It is preferable that the groove reflection coefficient $I_G/I_O$ be 0.5 or larger in order to obtain a desirable readout signal level. Also, it is preferable that the push-pull signal modulation level $I_{PP}/I_O$ be 0.2 or larger in order to obtain an accurate tracking capability.

In this view, it is apparent from FIGS. 8 through 13 that the preferable groove depth ranges from about 110 nm to about 220 nm, from about 230 nm to about 330 nm, or from about 350 nm to about 580 nm. In addition, when reading under H polarization, in comparison to the result obtained from E polarization, the reflection coefficient value of grooves is larger, facilitating to obtain a good read signal level. When reading in H polarization, a desirable result is obtained when the groove depth ranges from about 110 to about 210 nm, about 230 to about 320 nm, about 350 to about 440 nm, or about 450 to about 570 nm. In addition, the groove depth of 530 nm or larger substantially reduces thermal crosstalk for the track pitch of as narrow as 0.3 μm. At the track pitch equal to or less than 1.1 λ, the parameter a in d>λ/(an) ranges from 2.159 to 3.778, from 2.061 to 3.487, or from 2.061 to 3.022. At the track pitch equal to or less than 0.96 λ, the parameter a ranges from 2.159 to 3.778, from 2.159 to 3.238, from 2.061 to 3.487 or from 2.061 to 2.667. At the track pitch equal to or less than 0.81, the parameter a ranges from 2.267 to 3.778, from 2.159 to 3.022, from 2.159 to 3.238 or from 2.159 to 2.386.

In summary, the above described preferred embodiments of the current invention enable optical disks to operate at a high density without sacrificing a readout signal level and highly accurate tracking.

Embodiment Set 2

Preferred embodiments of the overwritable optic disks include: Guide-grooved transmittive substrate; $Si_3N_4$ Layer; GdFeCo layer (Gd 23%, Fe 65%, Co 12% (atom %)); TbFeCo layer (Tb 20%, Fe 76%, Co 4%); GdFeCo layer (Gd 24%, Fe 72.2%, Co 3.8%); DyFeCo layer (Dy 26%, Fe 48.1%, Co 25.9%); TbFeCo layer (Tb 17%, Fe 77%, Co 6%); TbFeCo layer (Tb 23%, Fe 15.4%, Co 61.6%); $Si_3N_4$ layer; Al layer and organic protective layer. As described for the Embodiment Set 1, 29 different groove depths are manufactured in Embodiment Set 2.

After placing the above overwritable optical disks in a record/readout system, the reflection coefficient and the push-pull signal modulation factor in grooves are measured in the same manner as measured from Embodiment Set 1. The results are substantially the same as those obtained in Embodiment Set 1 as shown in FIGS. 8 through 13. In other words, the preferred groove depth is from about 110 to about 220 nm, from about 230 to about 330 nm, or from about 350 to about 580 nm. In addition, when reading under the H polarization, in comparison to the result obtained under the B polarization, the reflection coefficient value of grooves is larger to facilitate a desirable read signal level. Also reading under the H polarization, a desirable result is obtained when the groove depth is from about 110 to about 210 nm, from about 230 to about 320 nm, from about 350 to about 440 nm, or from about 450 to about 570 nm.

A read signal level is maximized at the groove depth of $m\lambda/(2n)$ where the beam spot wave length is $\lambda$ and the refractive index of an optical disk substrate is n. Note that m is a natural number (m=1, 2, 3, 4, 5, 6, . . . ). For example, when $\lambda$=680 nm, n=1.5, and m=1, the maximum readout signal is obtained at the groove depth of 226.7 nm. Other two parameters being equal, when m=2, it is 453.3 nm while m=3, it is 680 nm. In reality, due to the direction of polarization and the like, it is not precisely $m\lambda/(2n)$ but may be, for example, $m\lambda/(1.8n)$ or $m\lambda/(1.95n)$ for reading under a normal polarization having the polarized surface parallel to the guided grooves. The push-pull signal modulation factor is maximized at the groove depth of $(2m+1) \lambda/(8n)$.

The increased groove depth on a conventional optical disk makes it difficult to manufacture a protective layer or optical recording layer in grooves that are recessed portions of the substrate surface. This is because the groove portion is hidden behind the land portion, and the substance for an optical recording layer is substantially prevented from reaching the grooves. For the manufacture of the disks using the sputtering method, this phenomenon is prominent. This problem does not occur in the land portion. As a result, the film thickness in the groove portion is thinner than that in the land portion. This problem is prominent at the edges of grooves near the land-groove boundary.

Since the film thicknesses are not uniform over the groove and land portions, the optimal data recording beam intensity for the groove potion needs to be adjusted from that for the land portion. In other words, the optimal data recording beam intensity for the groove portion needs to be lower than that for the land portion. However, if data is recorded in grooves using the-same value which is the optimal data recording beam intensity for the land portion, the beam energy is too strong for the optimal data recording beam intensity in the groove portion. Consequently, the length of the recording mark is undesirably longer than a predetermined desirable length, and the elongated recording marks likely cause an erroneous data read operation. On the other hand, if data is recorded in lands using the same value which is the optimal data recording beam intensity for the groove portion, the beam energy is too weak for the optimal data recording beam intensity in the groove portion. Again as a consequence, since the length of the recording mark is shorter than a predetermined desirable length, a data read error is likely to be resulted.

The above phenomena affect not only the film thickness but also the composition of an optical data recording layer. This is because each element which constitutes the optical data recording layer substance behaves differently during manufacture, and the shadow created by the land portion affects each element.

When the composition of an optical data recording layer deviates from a predetermined Composition, magnetic properties also change and possibly interfere with the desired functions. As a result, one may encounter problems such as increased data recording errors in either lands or grooves, or in worse cases, one may not be able to record.

The above described manufacturing problem impacts optical data storage media of the magnetically induced super resolution (MSR) and direct overwrite (DOW) type even more seriously than those of an ordinary type because the above disks each includes multiple optical data storage layers.

The current invention resolves the above problems and to provide an optical disk of excellent reliability with a uniform property in lands and grooves. It also provides a method of recording using such optical disks. The current invention assumes the groove depth of equal to or greater than $\lambda/4n$ and applies a wider width for grooves than lands to resolve the above problems.

Embodiment Set 3

According to one preferred method of the current invention, two types of optical disks whose sum of the land width and the groove width is 1.4 $\mu$m or 1.2 $\mu$m with the groove depth of 140 nm, 190 nm, 280 nm, and 550 nm. Optical disks having nine (groove width/land width) ratios such as 1, 1.05, 1.08, 1.1, 1.15, 1.2, 1.3, 1.5, and 2 satisfy the above sum requirement. Note that these optical disks are manufactured by sequentially sputtering a SiN layer, a TbFeCo optical data storage layer, and SiN layer on a substrate.

Figure 20:
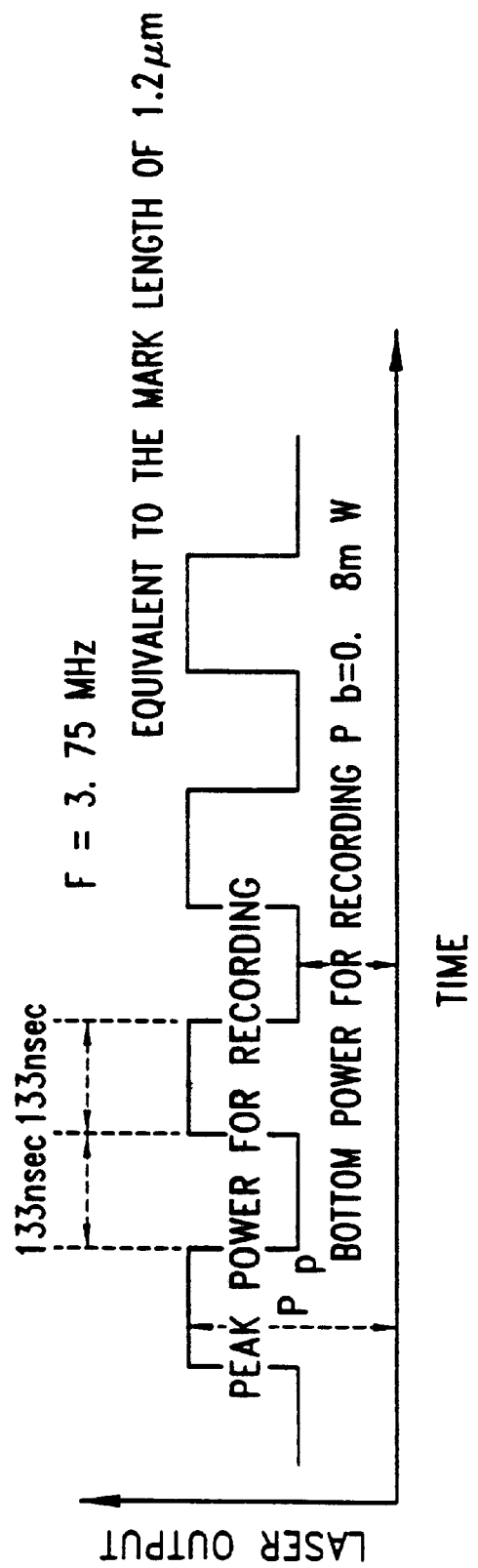
FIG. 20 is a diagram showing the laser driving wave profile during data recording.

The optical pickup in the optical disk drive has the light source wave length of 680 nm, objective lens numerical aperture (NA) aperture of 0.55, and the wavefront aberration of 0.04 (rms value). The direction of polarization of a beam emitted from the optical pick up is parallel in respect to the guide-grooved substrate, that is, E-polarization. After placing the above-described optical disks in the optical disk drive, the disks were rotated at a linear velocity of 9 m/sec., and the optimal data recording peak power of Pp in lands and grooves was measured. The optimal data recording peak power was defined as the minimum distortion level for the 2nd-order harmonic frequency when the recording marks are reproduced, and the reproduced signals are inputted to a spectrum analyzer. The laser driving wave profile at this time is illustrated in FIG. 20 in which the length of the recording mark is set to 1.2 $\mu$m and the space between the recording marks is also set to 1.2 $\mu$m. In addition, the data recording bottom power Pb is set to 0.8 mW, and the data recording magnetic field intensity is set to 350 0e at which no mark is recorded.

Figure 16:
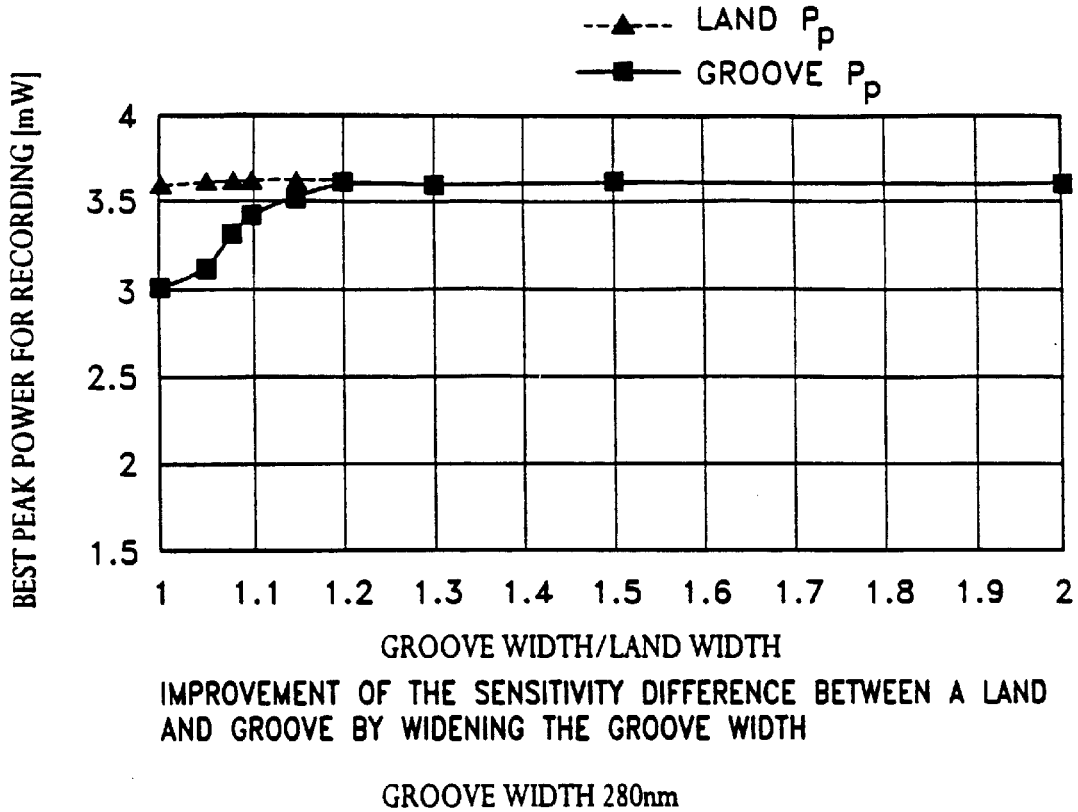
FIG. 16 is a graph showing the optimal data recording peak power for the land and groove width ratios of an optical disk of the current invention wherein the groove depth is 280 nm.
Figure 17:
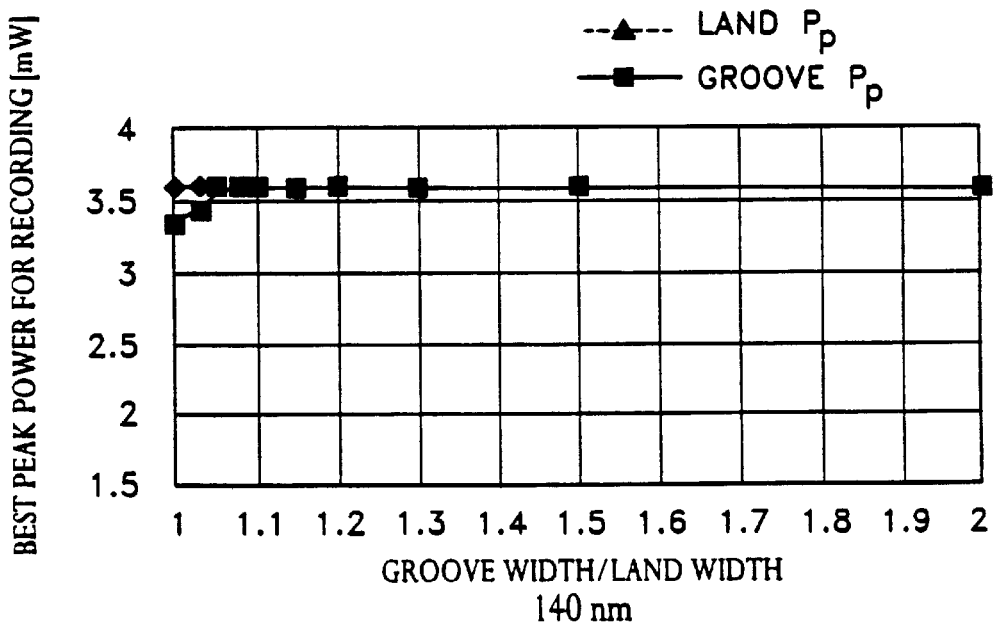
FIG. 17 is a graph showing the optimal data recording peak power for the land and groove width ratios of an optical disk of the current invention wherein the groove depth is 140 nm.
Figure 18:
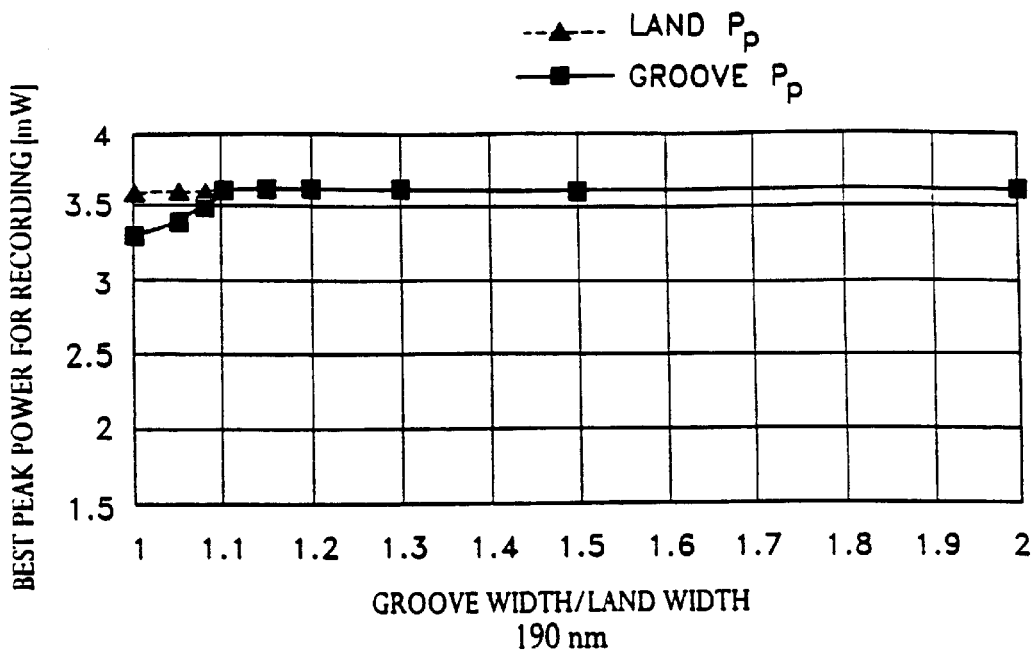
FIG. 18 is a graph showing the optimal data recording peak power for the land and groove width ratios of an optical disk of the current invention wherein the groove depth is 190 nm.
Figure 19:
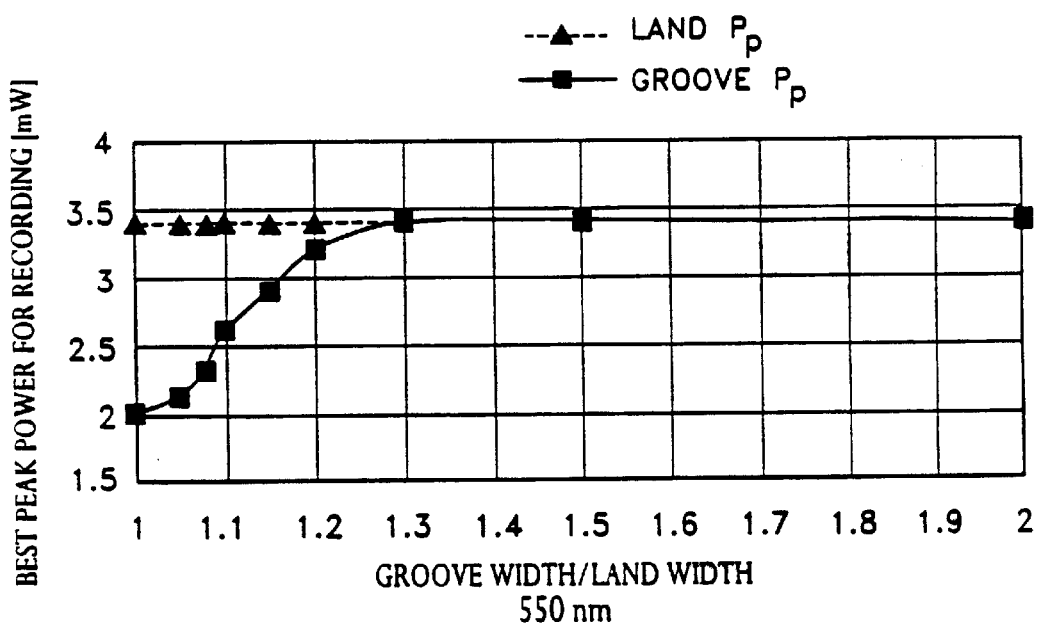
FIG. 19 is a graph showing the optimal data recording peak power for the land and groove width ratios of an optical disk of the current invention wherein the groove depth is 550 nm.
Figure 21:
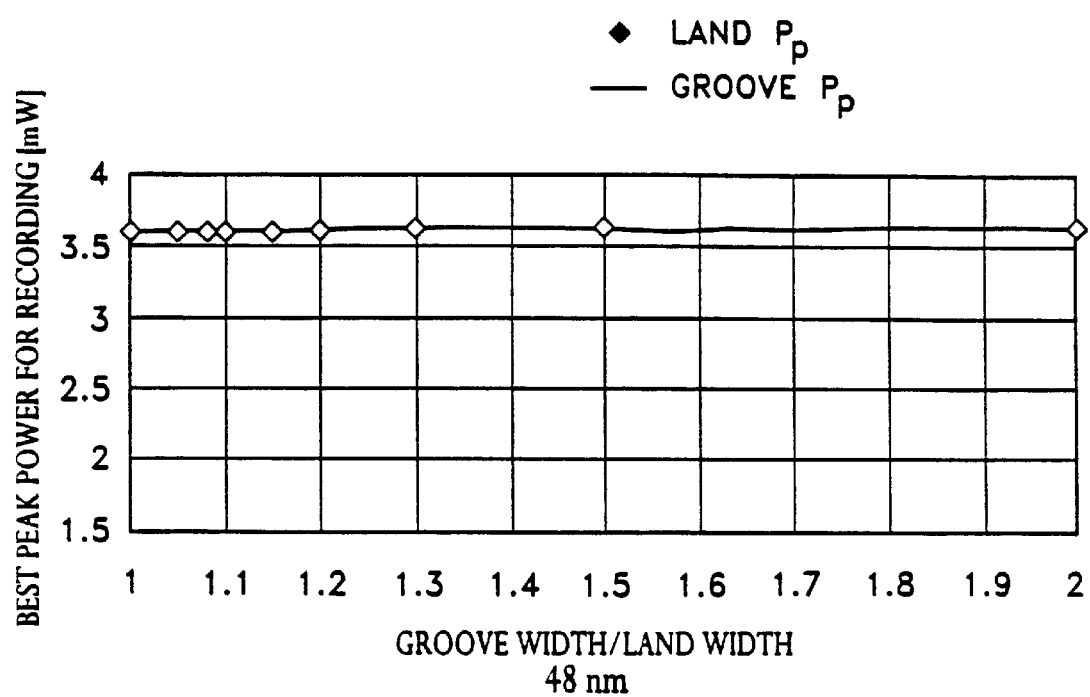
FIG. 21 is a graph showing the optimal data recording peak power for the land and groove width ratios of a conventional optical disk wherein the groove depth is 48 nm.

The measurements are plotted in FIGS. 16 through 19 for only those optical disks whose sum of the land width and the groove width is 1.4 $\mu$m, and the measurement for disks whose sum was 1.2 $\mu$m were substantially the same. FIG. 16 plots the measurements for optical disks whose groove depth is 280 nm. FIG. 17 plots the measurements for optical disks whose groove depth is 140 nm. Similarly, FIG. 18 plots the measurements for the optical disks with 190 nm step. While FIG. 19 plots the measurements for the one with 550 nm step. In contrast, FIG. 21 plots the measurements for conventional optical disks with the groove depth of 48 nm.

According to the above plots, if an optical disk has the groove/land width ratio of 1.05 or more, the disk functions well with the groove depth of equal to or greater than 140 nm. If the ratio is 1.2 or more, the groove depth of equal to or greater than 280 nm is desired. In addition, if the value is 1.3 or larger, the groove depth of at least 550 nm is necessary for the desirable effect.

However, to use a common sputtering method other than special sputtering methods or special fabrication methods, the groove/land width ratio needs to be even greater. In some cases, the preferable ratio is 1.3, 1.4 or larger.

In summary, according to the current invention, by widening the groove width of optical disks with a substantially increased groove depth, the composition of the data recording layer in lands and grooves or the film thickness of a protective layer is made substantially uniform. As a result, optical disks of excellent reliability having uniform magnetic properties such as the optimal data recording beam intensity in lands and grooves are manufactured according to the current invention.

As described above, this invention substantially reduces thermal crosstalk for optical disks and also can reduce both thermal crosstalk and noise from the substrate. In addition, this invention provides a method of recording on the above described optical disks.

What is claimed is:

1. An optical disk for substantially reducing thermal cross-talk during input and output operations to and from the optical disks, comprising:

grooves and lands located on the disk, a predetermined distance between said grooves and said lands being defined as a predetermined track pitch, wherein said predetermined track pitch is equal to or less than 1.1 $\lambda$ where $\lambda$ is a laser wavelength used during the operations, said grooves having a depth "d" in relation to said lands, wherein said depth is related to a parameter variable "a" and a refraction index "n" of an optical disk substrate in a relation d=$\lambda$/(an) wherein said parameter "a" ranges from 2.159 to 3.778.

2. An optical disks disk for substantially reducing thermal cross-talk during input and output operations to and from the optical disks, comprising:

grooves and lands located on the disk, a predetermined distance between said grooves and said lands being defined as a predetermined track pitch, wherein said predetermined track pitch is equal to or less than 1.1 $\lambda$ where $\lambda$ is a laser wavelength used during the operations, said grooves having a depth "d" in relation to said lands, wherein said depth is related to a parameter variable "a" and a refraction index "n" of an optical disk substrate in a relation as d=$\lambda$/(an) wherein said parameter "a" ranges from 2.061 to 3.487.

3. An optical disk for substantially reducing thermal cross-talk during input and output operations to and from the optical disks, comprising:

grooves and lands located on the disk, a predetermined distance between said grooves and said lands being defined as a predetermined track pitch, wherein said predetermined track pitch is equal to or less than 1.1 $\lambda$ where $\lambda$ is a laser wavelength used during the operations, said grooves having a depth "d" in relation to said lands, wherein said depth is related to a parameter variable "a" and a refraction index "n" of an optical disk substrate in a relation as d=$\lambda$/(an) wherein said parameter "a" ranges from 2.061 to 3.022.

4. An optical disk for substantially reducing thermal cross-talk during input and output operations to and from the optical disks, comprising:

grooves and lands located on the disk, a predetermined distance between said grooves and said lands being defined as a predetermined track pitch, wherein said predetermined track pitch is equal to or less than 1.1 $\lambda$ where $\lambda$ is a laser wavelength used during the operations, said grooves having a depth "d" in relation to said lands, wherein said depth is related to a parameter variable "a" and a refraction index "n" of an optical disk substrate in a relation as d=$\lambda$/(an) wherein said parameter "a" ranges from 1.365 to 1.959.

5. An optical disk for substantially reducing thermal cross-talk during input and output operations to and from the optical disks, comprising:

grooves and lands located on the disk, a predetermined distance between said grooves and said lands being defined as a predetermined track pitch, wherein said predetermined track pitch is equal to or less than 1.1 $\lambda$ where $\lambda$ is a laser wavelength used during the operations, said grooves having a depth "d" in relation to said lands, wherein said depth is related to a parameter variable "a" and a refraction index "n" of an optical disk substrate in a relation as d=$\lambda$/(an) wherein said parameter "a" ranges from 0.716 to 1.288.

6. An optical disk for substantially reducing thermal cross-talk during input and output operations to and from the optical disks, comprising:

grooves and lands located on the disk, a predetermined distance between said grooves and said lands being defined as a predetermined track pitch, wherein said predetermined track pitch is equal to or less than 1.1 $\lambda$ where $\lambda$ is a laser wavelength used during the operations, said grooves having a depth "d" in relation to said lands, wherein said depth is related to a parameter variable "a" and a refraction index "n" of an optical disk substrate in a relation as d=$\lambda$/(an) wherein said wavelength $\lambda$ is equal to or less than 690 nm.

7. An optical disk for substantially reducing thermal cross-talk during input and output operations to and from the optical disks, comprising:

grooves and lands located on the disk, a predetermined distance between said grooves and said lands being defined as a predetermined track pitch, wherein said predetermined track pitch is equal to or less than 0.96 $\lambda$ where $\lambda$ is a laser wavelength used during the operations, said grooves having a depth "d" in relation to said lands, wherein said depth is related to a parameter variable "a" and a refraction index "n" of an optical disk substrate in a relation as d=$\lambda$/(an).

8. An optical disk for substantially reducing thermal cross-talk during input and output operations to and from the optical disks, comprising:

grooves and lands located on the disk, a predetermined distance between said grooves and said lands being defined as a predetermined track pitch, wherein said predetermined track pitch is equal to or less than 1.1 $\lambda$ where $\lambda$ is a laser wavelength used during the operations, said grooves having a depth "d" in relation to said lands, wherein said depth is related to a parameter variable "n" of an optical disk substrate in a relation as d>λ/(4n).

9. The optical disk according to claim 8 wherein said wavelength λ is equal to or less than 690 nm.

10. The optical disk according to claim 8 wherein said depth "d" is selected so as to make $I_{pp}/I_o \geq 0.2$.

11. The optical disk according to claim 8 wherein said depth "d" is selected so as to make $I_G/I_o \geq 0.5$.

12. The optical disk according to claim 8 wherein said depth "d" is selected so as to make Pe/Pp≧1.2.

13. The optical disk according to claim 8 wherein said depth "d" is selected so as to make Pe/Pp≧1.3.

14. An optical dish for substantially reducing thermal cross-talk during input and output operations to and from the optical disks, comprising:

grooves and lands located on the disk for storing data on both said grooves and said lands, a predetermined distance between said grooves and said lands being defined as a predetermined track pitch, wherein said predetermined track pitch is also specified by a predetermined width ratio of said grooves and said lands, said grooves having a depth "d" in relation to said lands, wherein said depth is related to a laser wavelength λ used during the operations and a refraction index "n" of an optical disk substrate in a relation as d≧λ/(4n).

15. The optical disk according to claim 14 wherein said wavelength λ is equal to or less than 690 nm.

16. The optical disk according to claim 14 wherein said predetermined width ratio is larger than 1.

17. The optical disk according to claim 14 wherein said predetermined width ratio is equal to or larger than 1.05.

18. The optical disk according to claim 14 wherein said predetermined width ratio is equal to or larger than 1.08.

19. The optical disk according to claim 14 wherein said predetermined width ratio is equal to or larger than 1.1.

20. The optical disk according to claim 14 wherein said track pitch is equal to or less than 1.1 λ.

21. The optical disk according to claim 14 wherein said track pitch is equal to or less than 0.96 λ.

22. The optical disk according to claim 14 wherein said track pitch is equal to or less then 0.81 λ.

23. The optical disk according to claim 14 wherein said depth "d" is selected so as to make Pp(groove)/Pp(land) ≧80.

24. The optical disk according to claim 14 wherein said depth "d" is selected so as to make Pp(groove)/Pp(land) ≧85.

25. The optical disk according to claim 7 wherein said parameter "a" ranges from 2.061 to 3.778.

26. The optical disk according to claim 7 wherein said parameter "a" ranges from 1.365 to 1.959.

27. The optical disk according to claim 7 wherein said parameter "a" ranges from 0.778 to 1.288.

28. The optical disk according to claim 7 wherein said wavelength λ is equal to or less than 690 nm.

* * * * *